(12) United States Patent
Ulammandakh

(10) Patent No.: US 11,861,526 B2
(45) Date of Patent: ***Jan. 2, 2024

(54) IMAGE RANKING SYSTEM

(71) Applicant: Airbnb, Inc., San Francisco, CA (US)

(72) Inventor: Bilguun Ulammandakh, Santa Rosa, CA (US)

(73) Assignee: Airbnb, Inc., San Francisco, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 17/520,953

(22) Filed: Nov. 8, 2021

(65) Prior Publication Data

US 2022/0374646 A1 Nov. 24, 2022

Related U.S. Application Data

(63) Continuation of application No. 17/326,862, filed on May 21, 2021, now Pat. No. 11,200,449.

(51) Int. Cl.
*G06K 9/00* (2022.01)
*G06Q 30/0601* (2023.01)
*G06N 20/00* (2019.01)
*G06F 18/2113* (2023.01)
*G06F 18/214* (2023.01)
(Continued)

(52) U.S. Cl.
CPC ....... *G06Q 30/0601* (2013.01); *G06F 18/214* (2023.01); *G06F 18/2113* (2023.01); *G06N 20/00* (2019.01); *G06V 20/30* (2022.01); *G06V 20/35* (2022.01)

(58) Field of Classification Search
CPC ............. G06Q 30/0601; G06F 18/2113; G06F 18/214; G06N 20/00; G06N 20/20; G06N 3/08; G06V 20/30; G06V 20/35
See application file for complete search history.

(56) References Cited

U.S. PATENT DOCUMENTS 10,430,902 B1 10/2019 Rawat et al.
10,930,057 B2 2/2021 Dougherty et al.
(Continued)

FOREIGN PATENT DOCUMENTS

WO 2020205429 10/2020

OTHER PUBLICATIONS

"U.S. Appl. No. 17/326,862, Notice of Allowance dated Sep. 1, 2021".
(Continued)

*Primary Examiner* — Samir A Ahmed
(74) *Attorney, Agent, or Firm* — Schwegman Lundberg & Woessner, P.A.

(57) ABSTRACT

Systems and methods are provided for generating a base visual score for each candidate image of a plurality of images received by a computing system, based on the scene type of each image. For each candidate image, the computing system multiplies the base visual score by a feature importance weight to generate a first visual score, adds respective scene type bonus points to the first visual score to generate a second visual score, and adds diversity scoring points to the second visual score to generate a final visual score for each candidate image. The computing system ranks the candidate images based on the final visual scores and provides a specified number of the top-ranked candidate images to be displayed on a display of the computing device.

20 Claims, 15 Drawing Sheets

(51) Int. Cl.
*G06V 20/30* (2022.01)
*G06V 20/00* (2022.01)

(56) References Cited

U.S. PATENT DOCUMENTS

| | | | |
|---|---|---|---|
| 10,937,235 | B2 | 3/2021 | Dougherty et al. |
| 11,200,449 | B1 * | 12/2021 | Ulammandakh ...... G06N 20/00 |
| 11,361,421 | B1 | 6/2022 | Ulammandakh |
| 2003/0090572 | A1 | 5/2003 | Belz et al. |
| 2004/0101212 | A1 | 5/2004 | Fedorovskaya et al. |
| 2011/0187704 | A1 | 8/2011 | Chen et al. |
| 2012/0128207 | A1 | 5/2012 | Manabe et al. |
| 2012/0183204 | A1 | 7/2012 | Aarts et al. |
| 2012/0231424 | A1 | 9/2012 | Calman et al. |
| 2014/0207282 | A1 | 7/2014 | Angle et al. |
| 2015/0248719 | A1 | 9/2015 | Hansen |
| 2015/0363943 | A1 | 12/2015 | Yalniz et al. |
| 2015/0379557 | A1 | 12/2015 | Liu et al. |
| 2016/0042252 | A1 | 2/2016 | Sawhney et al. |
| 2016/0042253 | A1 | 2/2016 | Sawhney et al. |
| 2016/0042568 | A1 | 2/2016 | Farnham et al. |
| 2016/0098649 | A1 | 4/2016 | Ifrach et al. |
| 2016/0163098 | A1 | 6/2016 | Blanchflower et al. |
| 2016/0179844 | A1 | 6/2016 | Shen et al. |
| 2016/0196659 | A1 | 7/2016 | Vrcelj et al. |
| 2016/0330522 | A1 | 11/2016 | Newell et al. |
| 2017/0228940 | A1 | 8/2017 | Kutliroff |
| 2017/0337435 | A1 | 11/2017 | Uliyar et al. |
| 2018/0039713 | A1 | 2/2018 | Mrowca et al. |
| 2018/0047208 | A1 | 2/2018 | Marin et al. |
| 2018/0143756 | A1 | 5/2018 | Mildrew et al. |
| 2018/0144547 | A1 | 5/2018 | Shakib et al. |
| 2018/0260636 | A1 | 9/2018 | Zou et al. |
| 2018/0374276 | A1 | 12/2018 | Powers et al. |
| 2019/0102667 | A1 | 4/2019 | Bashkirov et al. |
| 2019/0120633 | A1 | 4/2019 | Afrouzi et al. |
| 2019/0204089 | A1 | 7/2019 | Rochan Meganathan et al. |
| 2019/0213212 | A1 | 7/2019 | Adato et al. |
| 2019/0294703 | A1 | 9/2019 | Bolin et al. |
| 2020/0312013 | A1 | 10/2020 | Dougherty et al. |
| 2020/0312021 | A1 | 10/2020 | Dougherty et al. |
| 2021/0117685 | A1 | 4/2021 | Sureshkumar et al. |
| 2021/0158422 | A1 | 5/2021 | D'souza et al. |
| 2022/0375058 | A1 | 11/2022 | Ulammandakh |

OTHER PUBLICATIONS

Yao, Shijing, et al., "Categorizing Listing Photos at Airbnb", https://medium.com/airbnb-engineering/categorizing-listing-photos-at-airbnb-f9483f3ab7e3, (May 2, 2018), 14 pgs.

"U.S. Appl. No. 17/326,880, Examiner Interview Summary dated Nov. 24, 2021", 3 pgs.

"U.S. Appl. No. 17/326,880, Non Final Office Action dated Aug. 19, 2021", 9.

"U.S. Appl. No. 17/326,880, Notice of Allowance dated Feb. 4, 2022", 9 pgs.

"U.S. Appl. No. 17/326,880, Response filed Nov. 17, 21 to Non Final Office Action dated Aug. 19, 2021", 11 pgs.

"U.S. Appl. No. 17/735,789, Examiner Interview Summary dated Jun. 9, 2023", 3 pgs.

"U.S. Appl. No. 17/735,789, Non Final Office Action dated Mar. 16, 2023", 14 pgs.

"U.S. Appl. No. 17/735,789, Notice of Allowance dated Aug. 7, 2023", 10 pgs.

"U.S. Appl. No. 17/735,789, Preliminary Amendment filed Jun. 8, 2022", 8 pgs.

"U.S. Appl. No. 17/735,789, Response filed Jun. 1, 2023 to Non Final Office Action dated Mar. 16, 2023", 9 pgs.

"U.S. Appl. No. 16/369,852, Non Final Office Action dated Apr. 16, 2020", 20 pgs.

"U.S. Appl. No. 16/540,166, Non Final Office Action dated May 8, 20", 15 pgs.

"International Application Serial No. PCT US2020 024953, International Search Report dated Jun. 18, 2020", 2 pgs.

"International Application Serial No. PCT US2020 024953, Written Opinion dated Jun. 18, 2020", 5 pgs.

"U.S. Appl. No. 16/540,166, Response filed Aug. 7, 2020 to Non Final Office Action dated May 8, 2020", 11 pgs.

"U.S. Appl. No. 16 369,852, Response filed Aug. 14, 2020 to Non Final Office Action dated Apr. 16, 2020", 14 pgs.

"U.S. Appl. No. 16/540,166, Notice of Allowance dated Oct. 26, 2020", 9 pgs.

"U.S. Appl. No. 16/369,852, Notice of Allowance dated Nov. 9, 2020", 9 pgs.

"International Application Serial No. PCT US2020 024953, International Preliminary Report on Patentability dated Oct. 14, 2021", 7 pgs.

"U.S. Appl. No. 17/735,789, Notice of Allowance dated Oct. 25, 2023", 10 pgs.

U.S. Appl. No. 17/326,880, U.S. Pat. No. 11,361,421, filed May 21, 2021, Visual Attractiveness Scoring System.

U.S. Appl. No. 17/735,789, filed May 3, 2022, Visual Attractiveness Scoring System.

* cited by examiner

Photos — 600

Liven up your listing with photos

Take photos using a phone or camera. Upload at least one photo to publish your listing and drag to reorder however you like. You can always add or edit your photos later. — 610

Help your place stand out with automatic photo sorting
Your listing photos will be automatically arranged to help you get more bookings, with key rooms and top-quality images featured first.

[Try it out] — 614

Add a caption

< Back        [Next]

Save and Exit

Tips for quality photos — 612
- Declutter your space
- Use natural daylight and avoid flash
- Shoot from room corners in landscape mode.
- Balance visible floor and ceiling space
- Highlight special décor and amenities
- Add photos of every room guests can access

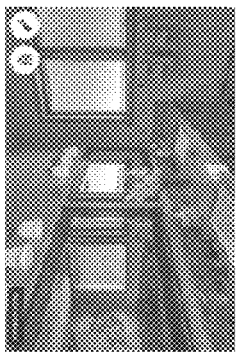

You're ready to publish!
You'll be able to welcome your first guest starting May 19, 2021. If you'd like to update your calendar or house rules, you can easily do all that after you hit publish.

√ Property and guests

√ Location

√ Amenities                               710

! Photos

Help your place stand out with automatic photo sorting
Your listing photos will be automatically arranged to help you get more bookings, with key rooms and top-quality images featured first.

Try it out

√ Description and title

√ Booking settings

√ Calendar and availability

√ Pricing

√ Review

Publish listing

FIG. 7

IMAGE RANKING SYSTEM

PRIORITY

This application is a continuation of U.S. patent application Ser. No. 17/326,862, filed May 21, 2021, which is incorporated by reference herein in its entirety.

BACKGROUND

An online marketplace may provide a number of services (e.g., accommodations, tours, transportation) and allow users to reserve or "book" one or more services. For example, a first user (e.g., host) can list one or more services on the online marketplace and a second user (e.g., guest) can request to view listings of services for a particular location (e.g., San Francisco) that may include a listing for the first user's service.

BRIEF DESCRIPTION OF THE DRAWINGS

Various ones of the appended drawings merely illustrate example embodiments of the present disclosure and should not be considered as limiting its scope.

FIGS. 6-8 each illustrate an example user interface, according to some example embodiments.

DETAILED DESCRIPTION

Figure 1:
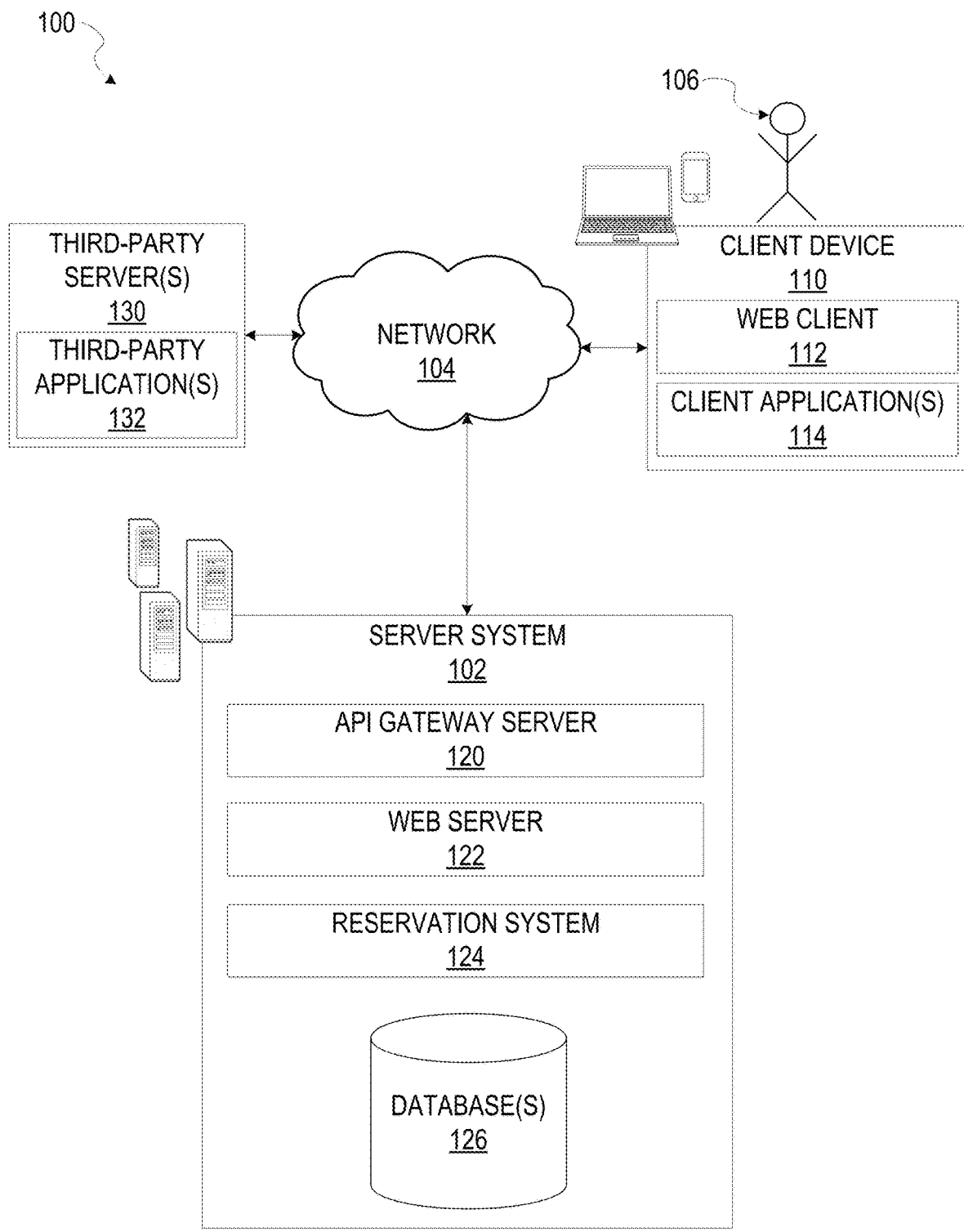
FIG. 1 is a block diagram illustrating a networked system, according to some example embodiments.

Systems and methods described herein relate to an image ranking system for generating and posting a new listing (e.g., accommodations, tours, transportation) or an existing listing on an online marketplace. For example, an online marketplace may provide various listings for services, such as trip items. Services or trip items may comprise accommodations hosted by various managers or hosts that can be reserved by clients or guests, such as an apartment, a house, a cabin, a camper, one or more rooms in an apartment or house, and the like. For example, one manager or owner of a home may list one or more rooms in his own home on the online marketplace, a second manager of a home may list an entire home on the online marketplace, a third manager may list an entire cabin on the online marketplace, and so forth. Such an online marketplace typically has millions of listings by different hosts, each unique in style, amenities, location, type, and so forth. The online marketplace may further provide listings for other services or trip items, such as experiences (e.g., local tours), car rentals, flights, public transportation, and other transportation or activities related to travel.

The process for a user to newly list a service, such as an accommodation, can be cumbersome. For example, a user has to come up with a title for the listing, a description, a list of amenities, images (e.g., photos), booking settings, calendar and availability, pricing, and so forth. Moreover, the images for a listing are one of the most critical factors for decision-making when a guest is deciding whether to book an accommodation or other service. However, most users do not know which images are most attractive to a potential guest, may take photos that are low quality, may take some relevant photos and other irrelevant photos, and so forth. Furthermore, there are typically thousands, if not tens of thousands, of new hosts listing new services each month in an online marketplace. In addition, there are millions of listings in an online marketplace and there is no way to help a guest find the most informative images, ensure the information conveyed in the images are accurate, or advise hosts about how to improve the appeal of their images in a scalable way.

Accordingly, there is a need to improve the process for a user to newly list a service, and, in particular, make it easier for a user to complete the step of adding and displaying images in a new listing. Further, there is a need to increase the booking success (e.g., conversion from a new listing to a first-time booked listing and future bookings) by determining the best images and best image order to display in a listing. Moreover, there is a further technical challenge of how to recommend images and determine a best image order to display in a listing in real time (or near real time) as a user is creating a new listing. There are also similar challenges with existing listings that may not have the most favorable order of images in the listing.

In order to overcome these technical limitations, example embodiments described herein use machine learning methodology to determine which images uploaded by a host, and in which order, will give a new or existing listing the best chance to be booked by a guest. A typical online marketplace comprises millions of listings across the world. These listings comprise a variety of different types of listings, types and quality of images, locations, and so forth. Thus, example embodiments leverage data from these millions of listings to train machine learning models to determine scene types for an image, visual scores (e.g., visual attractiveness) for an image, diversity of images, and other factors to rank images and recommend the images that are most likely to aid the listing to get booked by a guest. Moreover, images can be analyzed, ranked, and recommended in real time (or near real time) to improve the time it takes a host to newly list a service.

For example, embodiments described herein provide for a computing system to receive or access a plurality of images corresponding to a listing in an online marketplace, generate a scene type for each image of the plurality of images, and generate a base visual score for each image of the plurality of images based on the scene type. Optionally, the computing system can determine that a subset of the plurality of images are of a scene type not included in a predetermined group of scene types and discard images in the subset of the plurality of images that are of the scene type not included in the predetermined group of scene types to generate a list of candidate images comprising images that are of a type included in the predetermined group of scene types. For each candidate image of the list of candidate images, the computing system multiplies the base visual score by a feature importance weight to generate a first visual score, adds respective scene type bonus points to the first visual score to generate a second visual score, and adds diversity scoring points to the second visual score to generate a final visual score for the candidate image. The computing system can then rank the candidate images based on the final visual scores and provide a specified number of the top-ranked candidate images to be displayed on a display of the computing device.

In other example embodiments, a computing system analyzes listing images to generate an overall visual or attractiveness score for the listing in the online marketplace. For example, the computing system receives or retrieves a plurality of images corresponding to a listing in an online marketplace, generates a scene type for each image of the plurality of images, and groups each image into a scene type group of a set of predefined scene types. Each group of images are inputted into a respective machine learning model specific to the scene type of the group of images to generate a visual score for each image in each group of images, and an attractiveness score is generated for the listing in the online marketplace based on the visual scores for each image in each group of images.

FIG. 1 is a block diagram illustrating a networked system 100, according to some example embodiments. The networked system 100 may include one or more client devices such as a client device 110. The client device 110 may comprise, but is not limited to, a mobile phone, desktop computer, laptop, portable digital assistant (PDA), smart phone, tablet, ultrabook, netbook, laptop, multiprocessor system, microprocessor-based or programmable consumer electronic system, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, Global Positioning System (GPS) devices, and so forth. The client device 110 may be a device of a user that is used to request and receive reservation information, accommodation information, and so forth, associated with travel. The client device 110 may also be a device of a user that is used to post and maintain a listing for a service, request and receive reservation information, guest information, and so forth.

One or more users 106 may be a person, a machine, or other means of interacting with the client device 110. In example embodiments, the user 106 may not be part of the networked system 100 but may interact with the networked system 100 via the client device 110 or other means. For instance, the user 106 may provide input (e.g., voice input, touch screen input, alphanumeric input) to the client device 110 and the input may be communicated to other entities in the networked system 100 (e.g., third-party servers 130, a server system 102) via a network 104. In this instance, the other entities in the networked system 100, in response to receiving the input from the user 106, may communicate information to the client device 110 via the network 104 to be presented to the user 106. In this way, the user 106 may interact with the various entities in the networked system 100 using the client device 110.

The system 100 may further include a network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the internet, a portion of the public switched telephone network (PSTN), a cellular telephone network, a wireless network, a Wi-Fi network, a WiMAX network, another type of network, or a combination of two or more such networks.

The client device 110 may access the various data and applications provided by other entities in the networked system 100 via a web client 112 (e.g., a browser, such as the Internet Explorer® browser developed by Microsoft® Corporation of Redmond, Washington) or one or more client applications 114. The client device 110 may include one or more client applications 114 (also referred to as "apps") such as, but not limited to, a web browser, a messaging application, an electronic mail (email) application, an ecommerce site application, a mapping or location application, a reservation application, and the like.

In some embodiments, one or more client applications 114 may be included in a given one of the client devices 110 and configured to locally provide the user interface and at least some of the functionalities, with the client application 114 configured to communicate with other entities in the networked system 100 (e.g., third-party servers 130, the server system 102), on an as-needed basis, for data and/or processing capabilities not locally available (e.g., to access reservation or listing information, request data, authenticate a user 106, verify a method of payment). Conversely, one or more client applications 114 may not be included in the client device 110, and then the client device 110 may use its web browser to access the one or more applications hosted on other entities in the networked system 100 (e.g., third-party servers 130, the server system 102).

The networked system 100 may further include one or more third-party servers 130. The one or more third-party servers 130 may include one or more third-party application(s) 132. The one or more third-party application(s) 132, executing on the third-party server(s) 130, may interact with the server system 102 via a programmatic interface provided by an application programming interface (API) gateway server 120. For example, one or more of the third-party applications 132 may request and utilize information from the server system 102 via the API gateway server 120 to support one or more features or functions on a website hosted by a third party or an application hosted by the third party. The third-party website or application 132, for example, may provide various functionality that is supported by relevant functionality and data in the server system 102.

The server system 102 may provide server-side functionality via the network 104 (e.g., the internet or a WAN) to one or more third-party servers 130 and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace. The online marketplace may provide various listings for trip items, such as accommodations hosted by various managers (also referred to as "owners" or "hosts") that can be reserved by clients (also referred to as "users" or "guests"), such as an apartment, a house, a cabin, one or more rooms in an apartment or house, and the like. As explained above, the online marketplace may further provide listings for other trip items, such as experiences (e.g., local tours), car rentals, flights, public transportation, and other transportation or activities related to travel.

The server system 102 may include the API gateway server 120, a web server 122, and a reservation system 124 that may be communicatively coupled with one or more databases 126 or other forms of data store.

The one or more databases 126 may be one or more storage devices that store data related to the reservation system 124 and other systems or data. The one or more databases 126 may further store information related to third-party servers 130, third-party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage in some embodiments.

The reservation system 124 manages resources and provides back-end support for third-party servers 130, third-party applications 132, client applications 114, and so forth, which may include cloud-based applications. The reservation system 124 provides functionality for viewing listings related to trip items (e.g., accommodation listings, activity listings), generating and posting a new listing, analyzing and ranking images to be posted in a new listing, managing listings, booking listings and other reservation functionality, and so forth, for an online marketplace. Further details related to the reservation system 124 are shown in FIG. 2.

Figure 2:
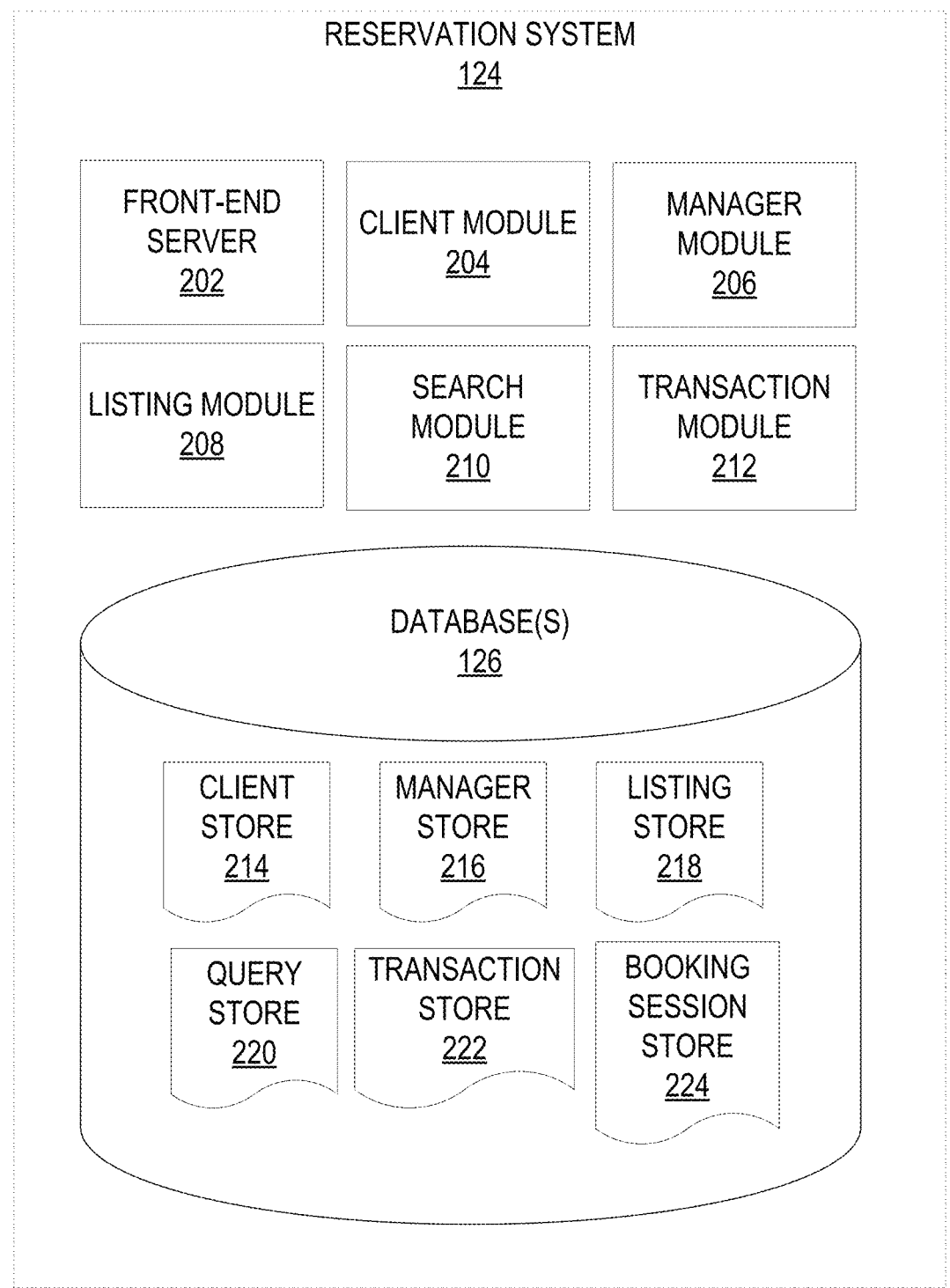
FIG. 2 is a block diagram illustrating a reservation system, according to some example embodiments.

FIG. 2 is a block diagram illustrating a reservation system 124, according to some example embodiments. The reservation system 124 comprises a front-end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 may be implemented using a single computing device or a network of computing devices, including cloud-based computer implementations. The computing devices may be server-class computers including one or more high-performance computer processors and random access memory, which may run an operating system such as Linux or the like. The operations of the reservation system 124 may be controlled either through hardware or through computer programs installed in nontransitory computer-readable storage devices such as solid-state devices or magnetic storage devices and executed by the processors to perform the functions described herein.

The front-end server 202 includes program code that allows client devices 110 to communicate with the reservation system 124. The front-end server 202 may utilize the API gateway server 120 and/or the web server 122 shown in FIG. 1. The front-end server 202 may include a web server hosting one or more websites accessible via a hypertext transfer protocol (HTTP), such that user agents, such as a web browser software application, may be installed on the client devices 110 and can send commands to and receive data from the reservation system 124. The front-end server 202 may also utilize the API gateway server 120 that allows software applications installed on client devices 110 to call to the API to send commands to and receive data from the reservation system 124. The front-end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124 and executes processing logic for client-related information that may be requested by other components of the reservation system 124. Each client is represented in the reservation system 124 by an individual client object having a unique client identifier (ID) and client profile, both of which are stored in the client store 214.

The client profile includes a number of client-related attribute fields that may include a profile picture and/or other identifying information, a geographical location, a client calendar, and so forth. The client's geographical location is either the client's current location (e.g., based on information provided by the client device 110) or the client's manually entered home address, neighborhood, city, state, or country of residence. The client location may be used to filter search criteria for time-expiring inventory relevant to a particular client or to assign default language preferences.

The client module 204 provides code for clients to set up and modify the client profile. The reservation system 124 allows each client to exchange communications, request transactions, and perform transactions with one or more managers.

The manager module 206 comprises program code that provides a user interface that allows managers (also referred to herein as "hosts" or "owners") to manage their interactions and listings with the reservation system 124 and executes processing logic for manager-related information that may be requested by other components of the reservation system 124. Each manager is represented in the reservation system 124 by an individual manager object having a unique manager ID and manager profile, both of which are stored in the manager store 216.

The manager profile is associated with one or more listings owned or managed by the manager and includes a number of manager attributes including transaction requests and a set of listing calendars for each of the listings managed by the manager.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list trip items, such as time-expiring inventory, for booking by clients. The listing module 208 is configured to receive the listing from a manager describing the inventory being offered; a timeframe of its availability including one or more of the start date, end date, start time, and an end time; a price; a geographical location; images and descriptions that characterize the inventory; and any other relevant information. For example, for an accommodation reservation system, a listing may include a type of accommodation (e.g., house, apartment, room, sleeping space, or other), a representation of its size (e.g., square footage, number of rooms), the dates that the accommodation is available, and a price (e.g., per night, per week, per month). The listing module 208 allows a user 106 to include additional information about the inventory, such as videos, photographs, and other media. The listing module 208 further analyzes images uploaded by a manager for a listing to provide a recommendation on which images to include and/or which order to show the images in the listing, as explained in further detail below.

The geographical location associated with the listing identifies the complete address, neighborhood, city, and/or country of the offered listing. The listing module 208 is also capable of converting one type of location information (e.g., mailing address) into another type of location information (e.g., country, state, city, neighborhood) using externally available geographical map information.

The price of the listing is the amount of money a client needs to pay in order to complete a transaction for the inventory. The price may be specified as an amount of money per day, per week, per month, and/or per season, or per another interval of time specified by the manager. Additionally, the price may include additional charges such as cleaning fees, pet fees, service fees, and taxes, or the listing price may be listed separately from additional charges.

Each listing is represented in the reservation system 124 by a listing object, which includes the listing information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a period (each of which may be thought of as an independent item of time-expiring inventory), as specified by the manager or determined automatically (e.g., through a calendar import process). For example, a manager may access the listing calendar for a listing, and manually indicate the time intervals for which the listing is available for transaction by a client, which time intervals are blocked as not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, a minimum or maximum number of people allowed for the inventory). Information from each listing calendar is stored in the listing store 218.

Figure 3:
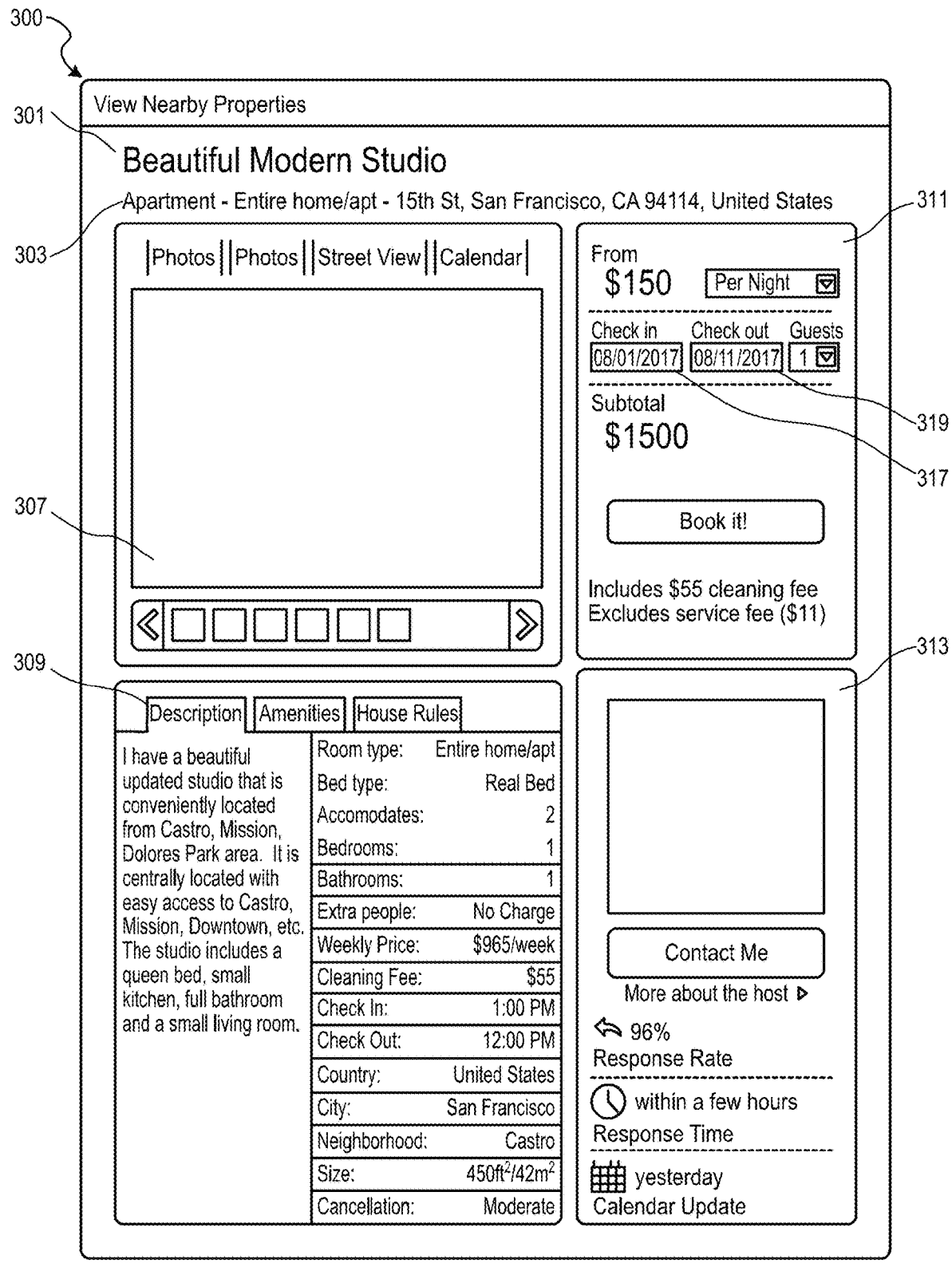
FIG. 3 illustrates an example user interface displaying an example listing for an accommodation in an online marketplace, according to some example embodiments.

FIG. 3 illustrates an example user interface 300 for a description of a listing for a trip item (e.g., an apartment in San Francisco) in an online marketplace. The example listing shown in FIG. 3 is for accommodations in San Francisco. In other examples, the listing could be for a tour, local experience, transportation service, or other trip item. The listing may include a title 301 and a brief description 303 of the trip item. The listing may further include photos of the trip item, maps of the area or location associated with the trip item, a street view of the trip item, a calendar for the trip item, and so forth, which may be viewed in area 307. The listing may include a detailed description 309, pricing information 311, and the listing host's information 313. The listing may further allow a user to select a date range for the trip item by entering or choosing specific check-in date 317 and check-out date 319.

Returning to FIG. 2, the search module 210 comprises program code configured to receive an input search query from a client and return a set of time-expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from the search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time-expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as a formal request) to transact for time-expiring inventory. In operation, the transaction module 212 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that agreeable terms are reached between the manager and the client. Modifications to a received request may include, for example, changing the date, price, or time/date range (and thus, effectively, which time-expiring inventory is being transacted for). The standardized form may require the client to record the start time/date, duration (or end time), or any other details that must be included for an acceptance to be binding without further communication.

The transaction module 212 receives the filled-out form from the client and, in one example, presents the completed request form including the booking parameters to the manager associated with the listing. The manager may accept the request, reject the request, or provide a proposed alternative that modifies one or more of the parameters. If the manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted on for a particular time interval. Other modules not specifically described herein allow the client to complete payment and the manager to receive payment.

The transaction module 212 may further comprise code configured to enable clients to instantly book a listing, whereby the online marketplace books or reserves the listing upon receipt of the filled-out form from the client.

The transaction store 222 stores requests made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request comprises a value indicating acceptance or denial and a timestamp. Other models may allow for instant booking, as mentioned above.

The transaction module 212 may also provide managers and clients with the ability to exchange informal requests to transact. Informal requests are not sufficient to be binding upon the client or manager if accepted, and, in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing or the transaction, viewing data that was recorded for the booking session, and so forth, to be stored in the booking session store 224. The transaction module 212 may utilize other modules or data stores to generate booking session data to be stored in the booking session store 224.

Figure 4A:
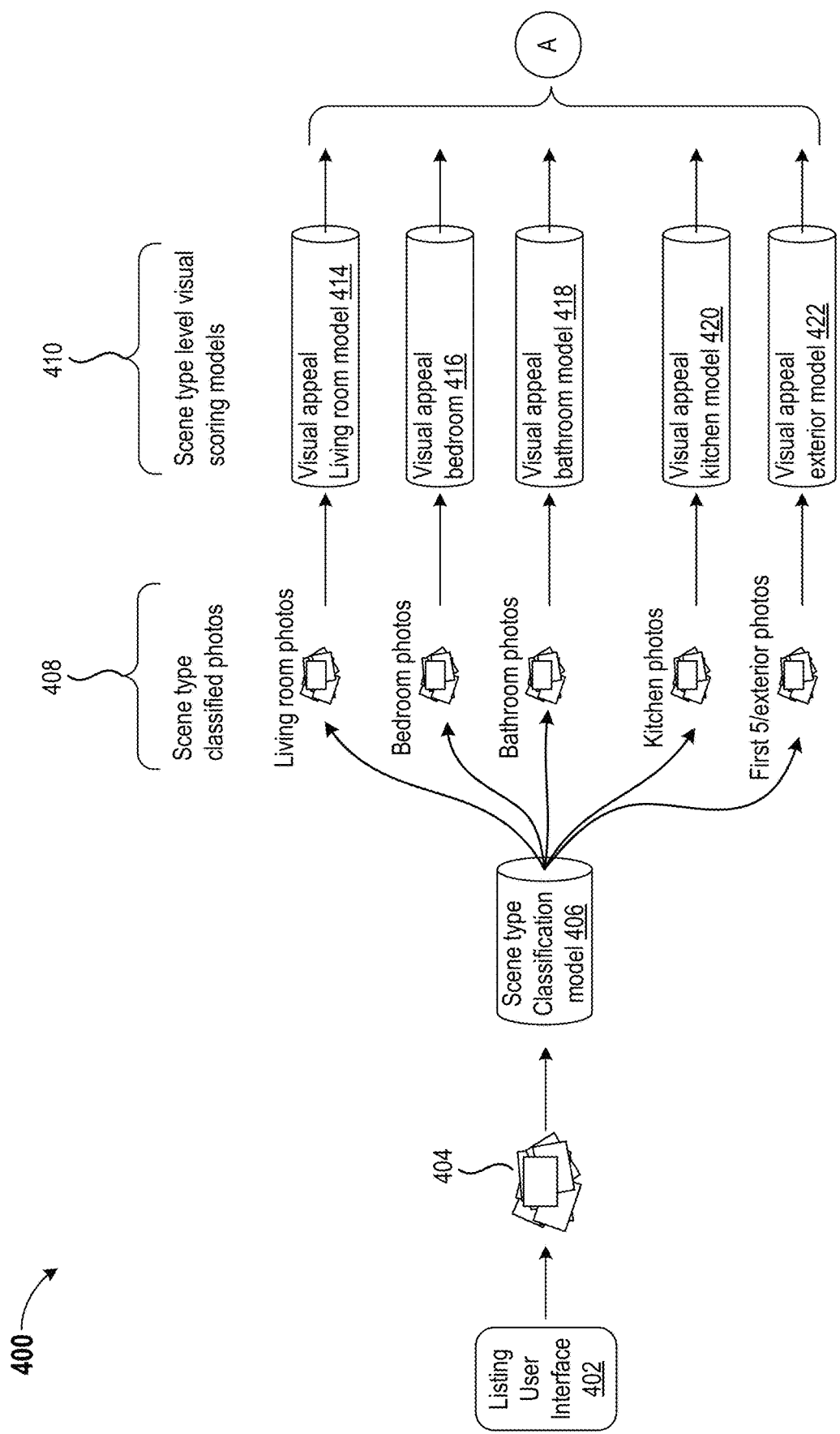
FIGS. 4A-4B illustrate an image ranking machine learning model architecture, according to some example embodiments.
Figure 4B:
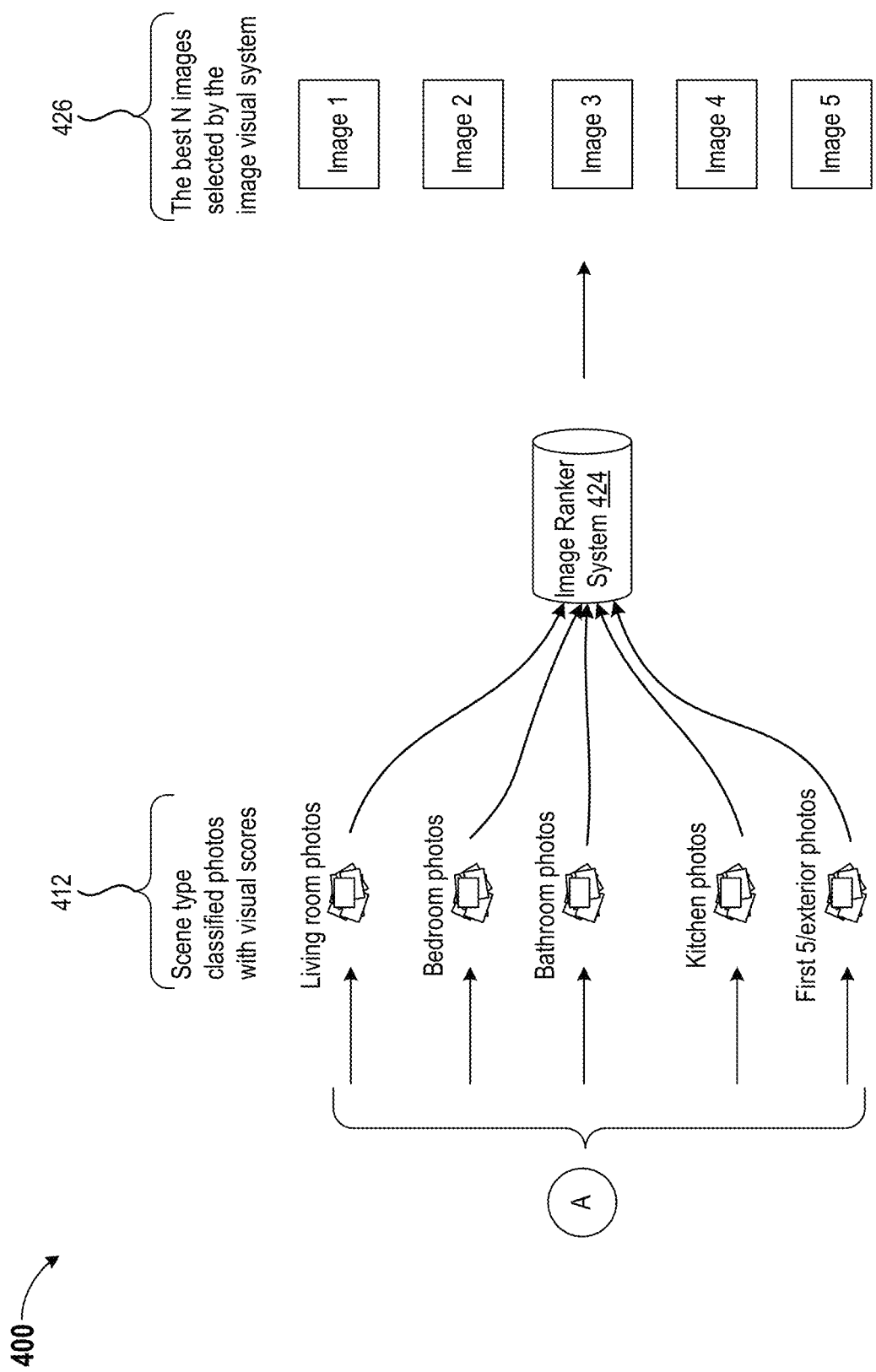

FIG. 4 illustrates an image ranking machine learning model architecture 400, according to some example embodiments. The image ranking machine learning model architecture 400 comprises a computing system (e.g., server system 102, reservation system 124, or other system) that receives listing images 404 (e.g., photos) via a listing user interface 402 displayed on a computing device, such as client device 110. In another example, the computing system can access listing images 404 via one or more datastores, such as database(s) 126.

The image ranking machine learning architecture 400 further comprises a scene type classification model 406. This scene type classification model 406 takes the received listing images 404 as input and outputs a scene type classification for each image, as shown by reference number 408. The scene type classification model 406 can be any classification model that has been customized by scene type (e.g., room type), such as deep neural network (DNN) models like a ResNet50 DNN classification model. In one example, a ResNet50 is customized by adding two extra fully connected layers and a Softmax activation in the end. It is to be understood that other classification models can be used in embodiments described herein. Also, in example embodiments the scene type comprises room types, such as a living room, bedroom, bathroom, and kitchen, as well as an exterior type (e.g., images of the exterior of an accommodation, such as a house or building), a views type (e.g., images of a view (ocean, mountains, city) from a house or building), and/or other scene types.

The image ranking machine learning model architecture 400 further comprises at least one visual scoring machine learning model 410 to generate a visual score 412 for each of the classified images 408. The visual score 412 indicates an attractiveness of each image.

In one example embodiment, the image ranking machine learning model architecture 400 comprises a visual scoring machine learning model 410 for each scene type. The visual scoring machine learning model 410 is also referred to as a scene type level visual scoring model(s) in FIG. 4A and scene type level image scoring model(s) in FIG. 9. For example, one visual scoring machine learning model 410 is provided for each of a living room scene type 414, bedroom scene type 416, bathroom scene type 418, kitchen scene type 420 and exterior scene type 422. The classified images 408 are each input into a respective visual scoring machine learning model 410. For instance, images classified as "living room" are input into a visual appeal living room model 414, images classified as "bedroom" are input into a visual appeal bedroom model 416, images classified as "bathroom" are input into a visual appeal bathroom model 418, images classified as "kitchen" are input into a visual appeal kitchen model 420, and images classified as "exterior" are input into a visual appeal exterior model 422. In this example, room types of living room, bedroom, bathroom, kitchen, and an exterior type are shown. It is to be understood that different or additional scene types can be used in example embodiments.

Figure 13:
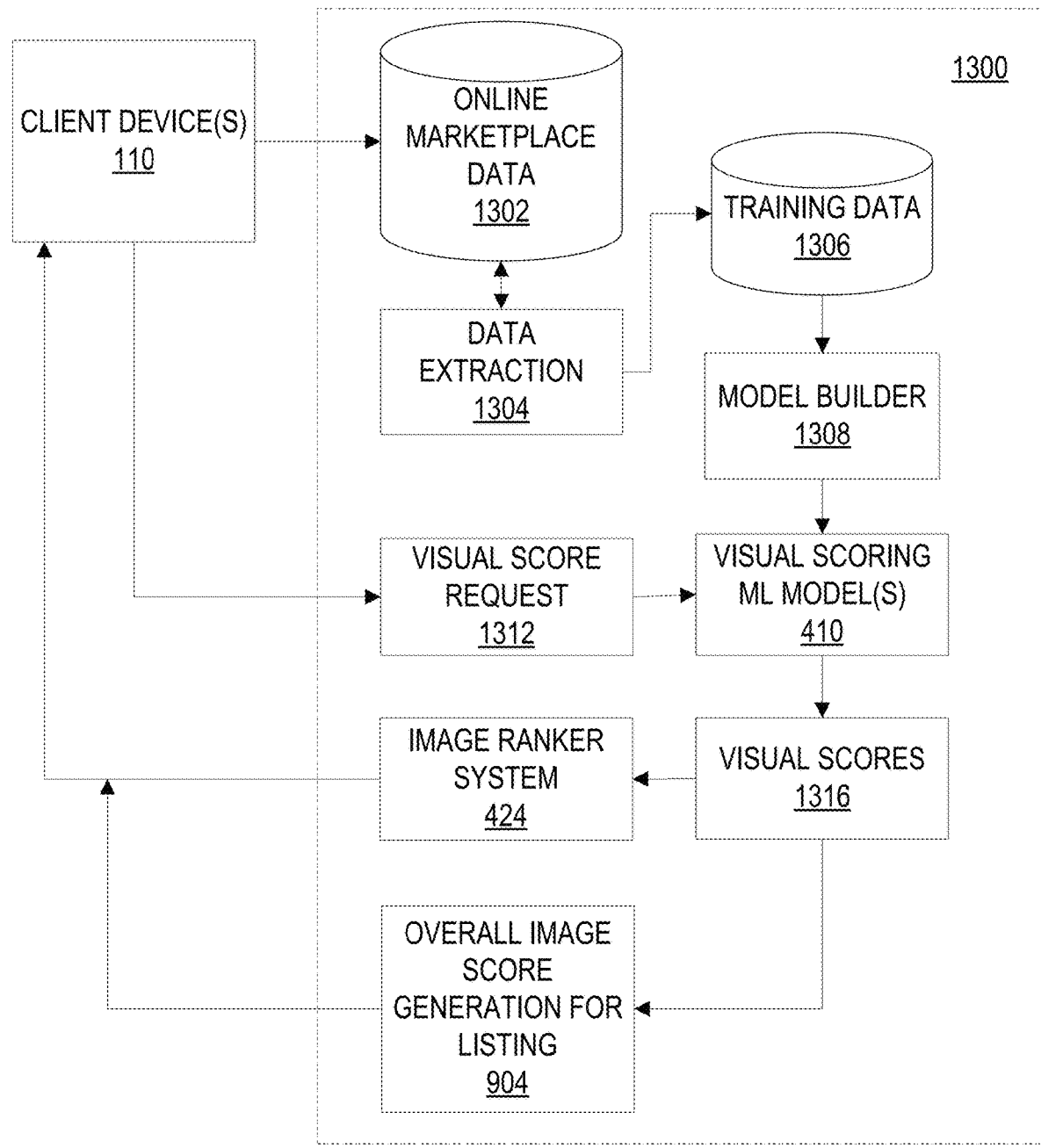
FIG. 13 is a block diagram illustrating a machine learning modeling system, according to some example embodiments.

In one example, the visual scoring machine learning model 410 is a neural network model, such as a multilayer perceptron neural network, a Keras neural network, or an XGBoost model used in conjunction with a neural network model that converts images into descriptive numerical embeddings. FIG. 13 is a block diagram illustrating a machine learning modeling system 1300 that may be part of the reservation system 124 or server system 102. The machine learning modeling system 1300 illustrates aspects of the visual scoring machine learning model 410.

Client devices 110 interact with the reservation system 124 or server system 102 thereby generating data related to the interactions with the system. For example, a client device 110 may be used to search for services in an online marketplace, view a list of services available in a given location, view individual listings for services, book one or more services, send and receive messages to and from hosts or managers of a service, generate a review for a listing or host, and so forth. Moreover, a client device 110 may be used to list a service (including uploading photos to include in a listing for the service), manage a service, send and receive messages to and from guests interested in the service, generate a review for a user (e.g., guest), and so forth. These interactions and data associated with the interactions are stored in one or more databases. In FIG. 13 this is shown as online marketplace data 1302. In other examples, this data may be stored in multiple databases, or in databases internal to the machine learning modeling system 1300, external to the machine learning modeling system 1300, or a combination of both.

The online marketplace data 1302 may further comprise data about markets or locations of services. For example, the online marketplace data 302 may comprise location data for a market (e.g., neighborhood, city, state, country), number of services or listings available in a market, how many instant-book listings are available in the market, how many non— instant-book listings are available in the market, popularity of the market, proximity of nearby markets, and so forth. The market or location data may also be in one or more data stores and stored internally to the machine learning modeling system 1300 and/or externally to the machine learning modeling system 1300. The data stored in the online marketplace data 1302 may be used for training a machine learning model, such as the visual scoring machine learning model(s) 410.

This online marketplace data 1302 may thus be received from client devices 110, from other datastores within the server system 102 or reservation system 124, and/or from third-party sources such as the third-party server 130. A data extraction component 1304 extracts data from the online marketplace data 1302 and stores the data as training data 1306. For example, the data extraction component 1304 may extract data related to users of the system, data related to hosts of the system, and data related to markets associated with the system.

In one example, a visual scoring machine learning model 410 specific to a scene type is trained using historical listings in the online marketplace. Accordingly, the data extraction component 1304 extracts listing data from the online marketplace data 1302. The data extraction component 1304 may extract listing data with specific characteristics, as described below.

In another example, two different machine learning models are used. A first machine learning model, referred to as a visual luxury model, is trained on historical listings that have a high percentage of professional quality images exhibiting luxury attributes such as spaciousness, desirable design elements and luxury amenities. A second machine learning model, referred to as a visual quality model, is trained on historical listings with a low percentage of professional quality images that also exhibit desirable attributes such as design elements and amenities. Either the first or second machine learning model can be used for each visual scoring machine learning model 410 (e.g., scene type machine learning model), or both can be used and the scores from each synthesized (e.g., averaged or combined for each image) to generate the scene type group score 902, described below. For example, the visual quality model can be used for living room scene type images and the visual luxury model can be used for each of the other scene type images. This is just one example; any combination of use of the two models can be used in embodiments described herein.

A model builder 1308 uses the training data 1306 to train the visual scoring machine learning model(s) 410 to generate a score for each image input into the visual scoring machine learning model(s) 410. As explained above, in one example embodiment the visual scoring machine learning model 410 is a neural network model, such as a multilayer perceptron neural network, a Keras neural network, or an XGBoost model used in conjunction with a neural network model that converts images into descriptive numerical embeddings. It is to be understood that other machine learning models may be used in other example embodiments. The visual scoring machine learning model(s) 410 is tested for accuracy until a final visual scoring machine learning model(s) 410 is trained and ready to use for generating visual scores for images.

A visual score request component 1312 receives a request for a visual score from the client device(s) 110. In one example, the request is for a visual score for images in a new listing or an existing listing. The visual score request component 1312 inputs images associated with the new or existing listing into the visual scoring machine learning model(s) 410. In one example embodiment, the images associated with the new or existing listing are classified with an associated scene type by the scene type classification model 406 before they are input into the visual scoring machine learning model(s) 410, as explained above and in greater detail below. The visual scoring machine learning model(s) 410 analyzes the features of each image to generate a visual score 1316 for each image. In one example, the score is a numerical value between 0 and 1 that indicates a visual appeal of the image. The image ranker system 424 analyzes the visual scores and provides the best N images based on the visual scores 1316, as explained in further detail below. The best N images are provided to the requesting client device 110.

In another example, the overall image score generation for a listing component 904 generates an overall appeal or attractiveness score for a listing, as explained in further detail below with respect to FIGS. 9 and 10.

Any one or more of the modules or components described herein may be implemented using one or more processors (e.g., by configuring such one or more processors to perform functions described for that module) and hence may include one or more of the processors. Any one or more of the modules described may be implemented using hardware alone (e.g., one or more of the processors of a machine) or a combination of hardware and software. For example, any module described of the machine learning modeling system 1300 may physically include an arrangement of one or more of the processors (e.g., a subset of or among the one or more processors of the machine) configured to perform the operations described herein for that module. As another example, any module of the machine learning modeling system 1300 may include software, hardware, or both, that configure an arrangement of one or more processors (e.g., among the one or more processors of the machine) to perform the operations described herein for that module. Accordingly, different modules of the machine learning modeling system 1300 may include and configure different arrangements of such processors or a single arrangement of such processors at different points in time. Moreover, any two or more modules of the machine learning modeling system 1300 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 14:
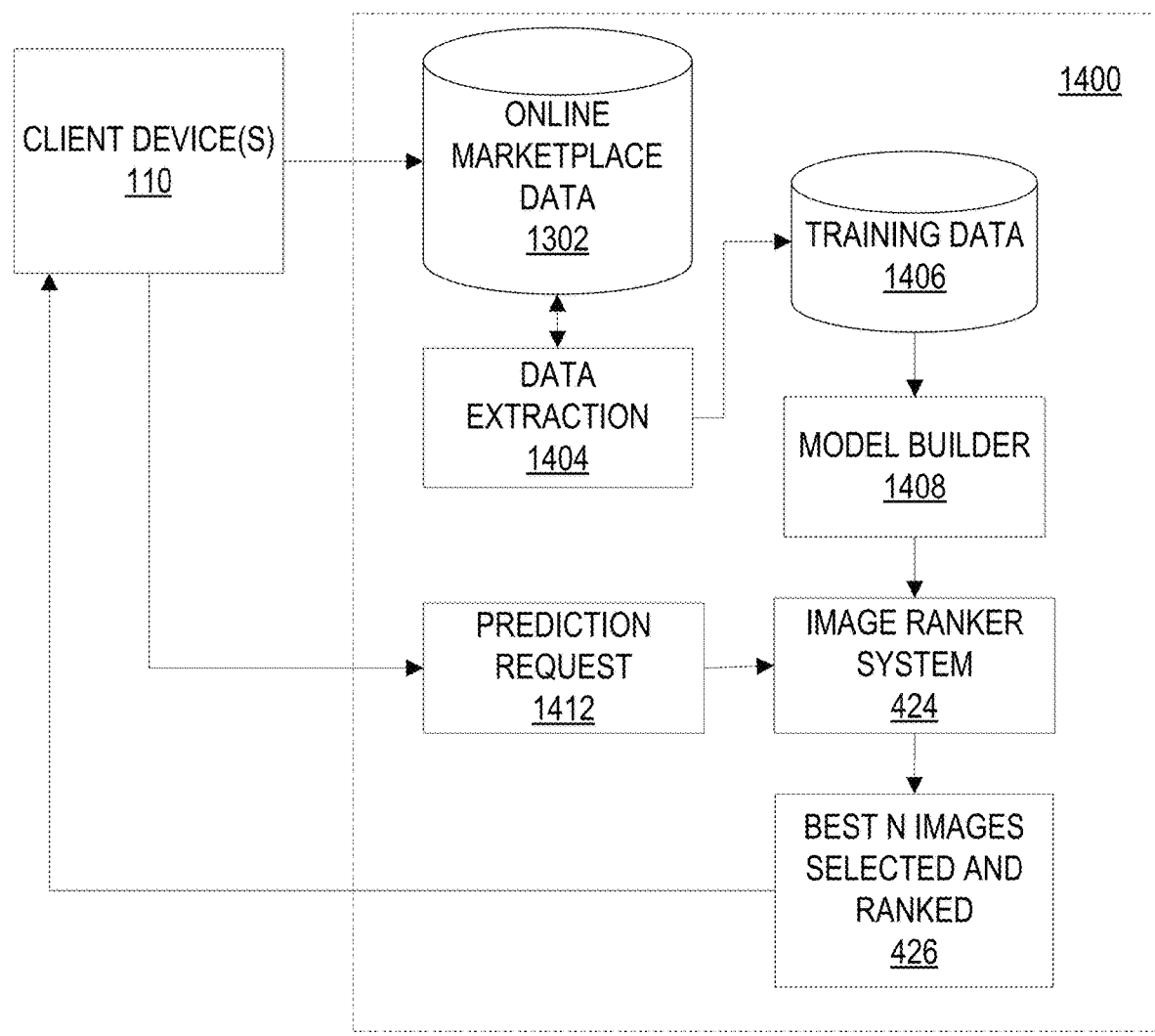
FIG. 14 is a block diagram illustrating a machine learning modeling system, according to some example embodiments.

Returning to FIG. 4, the image raking machine learning model architecture 400 further comprises an image ranker system 424 that is a machine learning model trained on past listing data. FIG. 14 is a block diagram illustrating a machine learning modeling system 1400 that may be part of the reservation system 124 or server system 102. The machine learning modeling system 1400 illustrates aspects of the image ranker system 424. As explained above with respect to FIG. 13, a data extraction component 1404 accesses listings in online marketplace data to extract training data 1406 for the image ranker system 424. The model builder 1408 uses the training data 1406 to train the image ranger system 424 to rank and select images for a listing. The image ranger system 424 is tested for accuracy until a final image ranger system 424 is trained and ready to use for generating visual scores for images.

The image ranker system 424 makes tradeoffs between image type, image attractiveness, and image diversity to select and provide the best N images 426 ranked in an order determined by the image ranker system 424. For example, the image ranker system 424 takes into account image attractiveness where images with higher visual scores should be preferred. The image ranker system 424 further takes into account image type (e.g., scene type) where certain types of photos are more relevant to users when deciding to book a listing. For example, data gleaned from existing listings indicates that bedroom, living room, and kitchen photos are usually more relevant than a photo of a scenery or view. The image ranker system 424 also takes into account diversity such that the image ranker system 424 should prefer to show different types of photos. For example, instead of showing five bedroom photos, all else equal, it would be preferable to show photos of the bedroom, living room, and kitchen.

One alternate way of ranking images may be to use a fixed heuristic for ranking. For example, living room⇒bedroom⇒kitchen⇒bathroom⇒pool. While this may work for a subset of listings, it will not be optimal for all accommodations because each accommodation is different and has different strength and weakness areas and spaces to showcase and highlight or exclude. For instance, one home might have an amazing living room but a mediocre bedroom, or vice versa. In another example, a second home may have mediocre interiors, but an amazing outdoor space. Further, a third home may have great living areas, but a less nice bathroom. In this example, highlighting the bathroom in the first few images could have a negative effect for a user deciding to book a listing. Thus, example embodiments comprise the image ranking machine learning model architecture 400 as described above and in further detail below.

The modeling problem for the image ranker system 424 can be formulated with an objective of selecting the most attractive, most relevant, and diverse set of N images to maximize the chances of a listing converting to a booked listing (e.g., first-time booked listing (FTBL)) within a specified period (e.g., 30 days). The approach is to train a model for the image ranker system 424 to maximize the FTBL conversion likelihood based on past listing success data given the three parameters of the most attractive, most relevant, and diverse. It is to be understood that additional or different parameters could be used in example embodiments.

In one example, a dataset of about 1.6 million new active listings onboarded in 2018 was used with FTBL success observed in 2019. In this example the dataset was filtered for listing for entire homes and listings that have five-plus images.

In one example, a logistic regression model is used where the target variable is FTBL status within 30 days (1 or 0) and where predictor variables comprise cover photo type (e.g., bedroom, kitchen, living room), inclusion of a given photo type in the first N photos (e.g., five photos), and an average visual quality score of the photos. The model also includes calendar average daily rate (ADR) and the bed and bath counts to control for these variables to reduce confounding effects. The ADR means the average nightly price of a home over X number of days, coming from booking data or calendar prices. The coefficients derived from the logistic regression model are used in the image ranker system 424, as explained in further detail below.

The best N images selected and ranked 426 are then returned to the client device 110, as further explained below.

Returning to FIG. 4, in the example image ranking machine learning model architecture 400, a total of six different neural network models are utilized, each specializing in a different computer vision task. In one embodiment, a seventh neural network model is used (e.g., MobileNet V1) that converts photos into image embeddings before they are input into any of the neural network models shown in FIG. 4.

Figure 5:
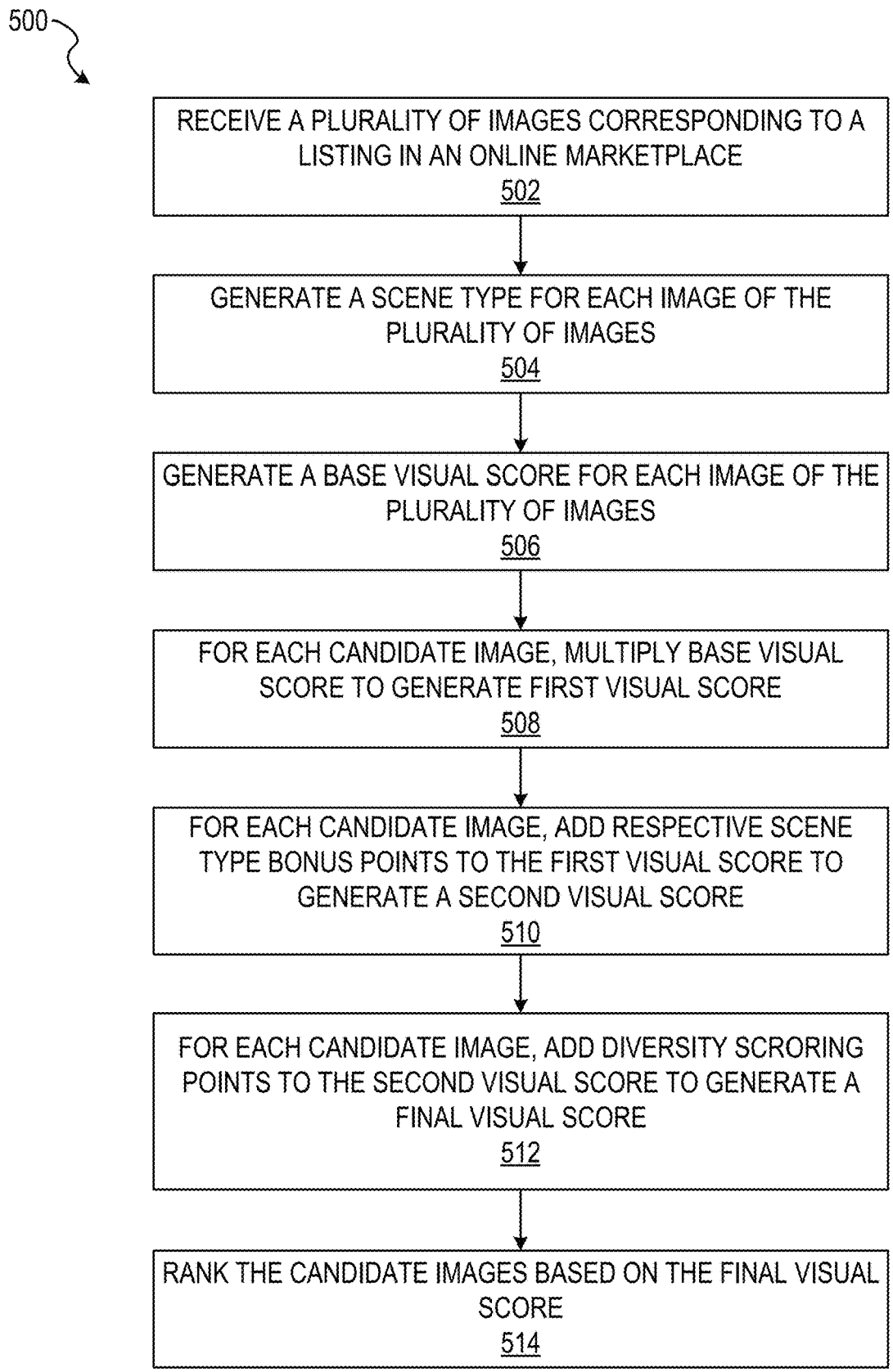
FIG. 5 is a flow chart illustrating aspects of a method for generating ranked images, according to some example embodiments.

FIG. 5 is a flow chart illustrating aspects of a method 500 for generating ranked images utilizing the image ranking machine learning model architecture 400, according to some example embodiments. For illustrative purposes, the method 500 is described with respect to the networked system 100 of FIG. 1, the reservation system 124 of FIG. 2, and the image ranking machine learning model architecture 400 of FIG. 4. It is to be understood that the method 500 may be practiced with other system configurations in other embodiments.

In operation 502, a computing system (e.g., the server system 102 and/or reservation system 124) receives a plurality of images corresponding to a listing in an online marketplace. For example, a user (e.g., a host or potential host) may access a user interface on a computing device (e.g., client device 110) to create a new listing for an accommodation, such as a home that the user wishes to list. There may be several steps for the user to enter information for the new listing, such as entering a location, entering amenities, uploading images (e.g., photos), entering a description for the listing, entering a title for the listing, entering booking settings, updating a calendar and availability for booking, entering pricing information, and so forth.

FIG. 6 illustrates an example user interface 600 that may be displayed to a user to upload photos for the listing. In particular, the user interface 600 gives an explanation for uploading photos 610, tips for capturing quality photos 612, and an option 614 to have the listing system automatically arrange uploaded photos. Note that in the example user interface 600 the option 614 is provided, but it is to be understood that instead of such an option, the images may simply be automatically arranged without the user specifically selecting such a feature. FIG. 7 illustrates another example user interface 700 with an option 710 to automatically sort photos. The user can upload photos for the new listing via the user interface 600 or 700, or another user interface. The computing device sends the images to be uploaded to the computing system. Thus, the computing device receives the uploaded images or accesses the uploaded images from one or more data stores (e.g., databases 126).

Returning to FIG. 5, in operation 504, the computing system generates a scene type for each image of the plurality of images received. As explained above with respect to the image ranking machine learning model architecture 400, the computing system utilizes a scene type classification model 406 to classify each image with a scene type. In one example, the scene type classification model 406 is a classification model customized by scene type (e.g., room type), such as DNN models like a ResNet50 model. Other classification models can be used in example embodiments.

The computing system inputs each image of the received plurality of images into the scene type classification model 406. The scene type classification model 406 outputs a scene type for each image. Thus, each image is given a specified scene type, or is given a scene type of "other" if it does not fall into one of the specified scene types. In one example, only a subset of potential scene types are specified, such as room types of living room, bedroom, bathroom, kitchen, or an exterior type. In other examples, different or additional scene types can be specified.

In operation 506, the computing system generates a base visual score for each image of the plurality of images. As explained above with respect to the image ranking machine learning model architecture 400, the computing system utilizes at least one visual scoring machine learning model 410 to generate a base visual score for each image of the plurality of images. The computing system inputs each image of the received plurality of images into the visual scoring machine learning model 410 to generate a base visual score for each image of the plurality of images. In one example, the score is a value between 0 and 1.

In one example embodiment, the computing system generates a base visual score for each image of the plurality of images based on the scene type for each image. In this example, one visual scoring machine learning model 410 is provided for each scene type. For example, if there are five specified scene types, living room, bedroom, bathroom, kitchen, and exterior, then a visual scoring machine learning model 410 is provided for each scene type, each specifically trained on the particular scene type. In this example, an image is input into the corresponding scene type classification model 406 based on the scene type of the image. For instance, if an image is classified as a bedroom, the image is input into a bedroom visual scoring machine learning model, if an image is classified as a living room, the image is input into a living room visual scoring machine learning model, and so forth. Having a separate visual scoring machine learning model that specializes in evaluating a specific category or type of image can reduce the noise that each model has to deal with and provides for a more accurate scoring when the model just specializes in identifying attractive bedrooms, for example. This reduces the amount of photo variance each model has to deal with. Each separate visual scoring machine learning model is trained on images specific to the scene type in which it specializes.

In one example, the images may be grouped by scene type and then input into a visual scoring machine learning model corresponding to the scene type to generate a base visual score for each image.

Once the base visual score is generated for each image of the plurality of images, the computing system then uses the plurality of images as a list of candidate images and calculates a final score for each candidate image utilizing a feature importance weight, scene type bonus points, and diversity scoring points. Before generating the final visual score, the computing system can optionally filter out images that are not of a particular scene type. For example, a predetermined group of scene types may be a subset of the total categories of scene types. In one example, the predetermined group of scene types comprises living room, bedroom, bathroom, kitchen, and exterior type. Thus, any images classified with scene types other than the predetermined group of scene types would be discarded.

For example, the computing system determines that a subset of the plurality of images are of a scene type not included in a predetermined group of scene types. The computing system would discard (e.g., remove from consideration) the images in the subset of the plurality of images that are not of the scene type included in the predetermined group of scene types to generate candidate images comprising images that are of a type included in the predetermined group of scene types. In this way, images that are not of the scene type desired are removed from consideration.

In one example, the computing system can consider including some images that are not included in the predetermined group of scene types if the images have a base visual score over a predetermined visual score threshold (e.g., 0.75 or 0.79 or 0.8). For example, if the base visual score is very high (e.g., 0.8 or 0.9) for one or more images that are not of the predetermined group of scene types, then the computing system can include those images even though there are not of the scene type included in the predetermined group of scene types. For example, the computing system discards images in the subset of the plurality of images that do not have a base visual score over a predetermined threshold to generate a list of candidate images comprising images that are of a type included in the predetermined group of scene type and images in the subset of the plurality of images that have a visual score over the predetermined visual score threshold.

In operation 508, the computing system (e.g., via the image ranker system 424), for each candidate image, multiplies the base visual score by a feature importance weight to generate a first visual score. In one example embodiment, the feature importance weight is derived using a logistic regression model, as described above. The logistic regression model is used as an example; it is to be understood that other machine learning models and other parameters can be used in embodiments described herein.

In one example, the feature importance weight to be used to rank the photos are computed using the coefficients derived using the logistic regression model trained to determine the probability of a listing getting booked based on a cover photo, scene types of the first predetermined number of photos in the listing, and an average visual score for the first predetermined number of photos in the listing. For example, coefficients derived from the logistic regression model can comprise a score or value for various parameters or features analyzed by the logistic regression model that indicate a likelihood of a listing getting booked. Some example parameters or features include visual quality score, the scene type of the cover image, a scene type of an image in the first N number of photos (e.g., first five photos), and so forth. In addition, various other factors can be included in the model to control for confounding factors, such as listing price, capacity and property type (e.g. house vs. apartment). In one example, the visual quality score is an average visual quality score across all photos in a listing. In one example, a logistic regression model trained on 1.6 million listings in an online marketplace generated the listing visual quality score as the feature with the largest coefficient. This suggests that the visual quality score was the most important feature that was most highly correlated with a new listing converting to an FTBL. For instance, in the logistic regression model, the coefficient for the visual quality score was over 1 (e.g., 1.28) and the other coefficients were less than 1 (e.g., bedroom as the first image 0.59, kitchen as the first image 0.61, other as the first image 0.51) Thus, the visual quality score can be used as the feature importance weight to generate a first visual score when ranking photos. It is to be understood that another parameter or feature that had a larger coefficient value in other models can be used to generate feature importance weights to be used in the image ranker.

To use a specific example, assume a user has uploaded a variety of images to be used for a new listing for a home. A simple example of six images that have been uploaded will be used:

| Image Number | Scene Type | Base Visual Score |
| --- | --- | --- |
| 1 | Other | .97 |
| 2 | Living room | .92 |
| 3 | Bedroom | .67 |
| 4 | Living room | .65 |
| 5 | Kitchen | .55 |
| 6 | Living room | .53 |

Further, assuming the feature importance weight in this example is 1.28, the computing system multiplies each base visual score by the feature importance weight to generate a first visual score:

| Image Number | Scene Type | Base Visual Score | First Visual Score |
|---|---|---|---|
| 1 | Other | .97*1.28 = | 1.24 |
| 2 | Living room | .92*1.28 = | 1.18 |
| 3 | Bedroom | .67*1.28 = | .86 |
| 4 | Living room | .65*1.28 = | .83 |
| 5 | Kitchen | .55*1.28 = | .70 |
| 6 | Living room | .53*1.28 = | .68 |

In operation 510, the computing system (e.g., via the image ranker system 424), for each candidate image, adds respective scene type bonus points to the first visual score to generate a second visual score. For this example, assume the logistic regression model generated the following coefficients for scene types (e.g., a value indicating how strongly a scene type appearing in a cover image (e.g., first photo displayed in a group of photos in a listing) lead to an FTBL): bedroom 0.59, kitchen 0.61, living room 0.66, other 0.51, pool 0.49, and view 0.50. Using these scene type bonus points, the second visual score would be generated as follows:

| Image Number | Scene Type | First Visual Score | Second Visual Score |
|---|---|---|---|
| 1 | Other | 1.24 + .51 = | 1.75 |
| 2 | Living room | 1.18 + .66 = | 1.84 |
| 3 | Bedroom | .86 + .59 = | 1.45 |
| 4 | Living room | .83 + .66 = | 1.49 |
| 5 | Kitchen | .70 + .61 = | 1.31 |
| 6 | Living room | .68 + .66 = | 1.34 |

In operation 512, the computing system (e.g., via the image ranker system 424), for each candidate image, adds diversity scoring points to the second visual score to generate a final visual score for each candidate image. The purpose of diversity points is to be sure the first N images recommended by the computing system are also diverse and that the order is not just based on a scene type and the first visual score. For this example, assume that the logistic regression model generated the following coefficients for a scene type for images displayed in the first N images (e.g., first five images): living room 1.05, bedroom 0.87, kitchen 0.24, bathroom −0.79, pool −2.9, view −1.3, and other 0. These coefficients are used as diversity scoring points to generate the final visual score.

In one example embodiment, the diversity scoring points are only added to an image with a highest visual score (e.g., second visual score) within a scene type. For instance, if there is more than one living room image, the diversity scoring points would only be added to the living room image having the highest visual score. In the example below, there are three living room images: image numbers 2, 4, and 6. As can be seen, image number 2 has the highest visual score of 1.84 versus 1.49 and 1.34 for image numbers 4 and 6. Thus, in this example, the diversity scoring points would only be added to image number 2 for the living room images.

Using these examples, the third visual score is generated as follows:

| Image Number | Scene Type | Second Visual Score | Final Visual Score |
|---|---|---|---|
| 1 | Other | 1.75 + 0 = | 1.75 |
| 2 | Living room | 1.84 + 1.05 = | 1.89 |
| 3 | Bedroom | 1.45 + .87 = | 2.32 |
| 4 | Living room | 1.49 + 0 = | 1.49 |
| 5 | Kitchen | 1.31 + .24 = | 1.55 |
| 6 | Living room | 1.34 + 0 = | 1.34 |

Note that if there were images with a negative coefficient (e.g. bathroom, pool, or view scene type), these images would each be penalized using −0.79, −2.9, and −1.3, respectively, so that all photos in these categories are down-ranked in the sequence (e.g., the second visual score would be reduced by these amounts). For example, if there is an image of a pool, the second visual score would be reduced by −2.9. In operation 514, the computing system ranks the candidate images based on the final visual scores. Thus, the images in the example above would be ranked in the order of image 3, image 2, image 1, image 5, image 4, image 6.

Figure 8:
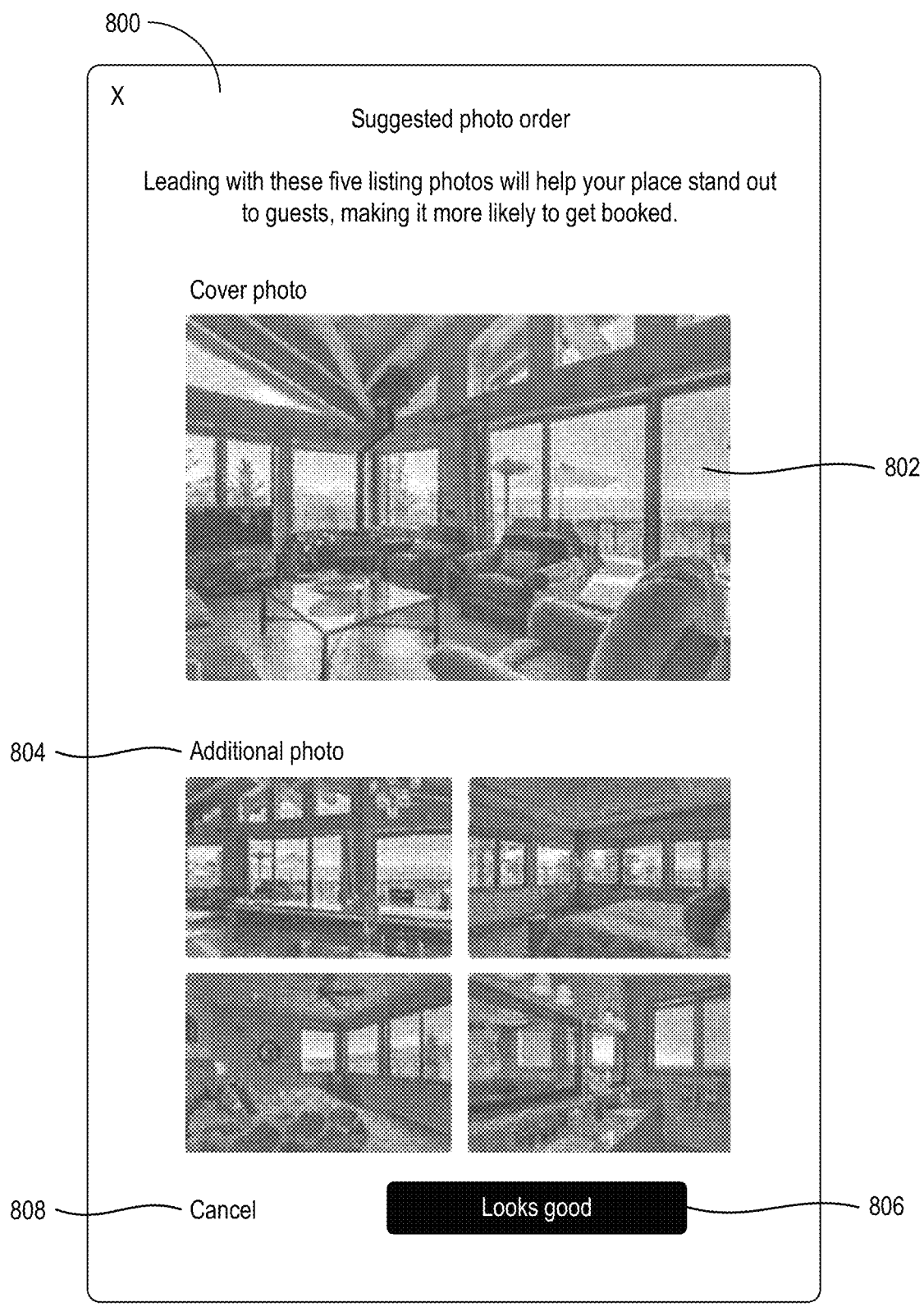

The computer system then provides the images to the computing device to be displayed to the user in ranked order. In one example, only a specified number (e.g., five) images are provided to be displayed to the user in ranked order. FIG. 8 illustrates an example user interface 800 displayed on a computing device that displays a suggested photo order based on the ranked images. For example, the user interface displays five images including the first ranked image (e.g., image 3 in the above example) as the suggested cover photo 802, and four additional images 804 in ranked order. The user can then select an option 806 to accept the photos in the order provided or an option 808 to cancel the suggestion and arrange the photos in a different order. If a user selects the option 806 to accept the photos in the order provided, the computing system will detect the selection (e.g., an indication of the selection will be sent from the computing device to the computing system) and store the images in the order suggested to be displayed in the listing once it is posted live.

In one example embodiment, the specified number of the top ranked candidate images are provided to be displayed on a display of a computing device, with a goal of generating a photo ranking sequence maximizing a given objective. In one example, the objective is a listing booking or engagement in an online marketplace.

The above examples are described in the context of creating a new listing. It is to be understood that the above example embodiments can also be used for existing listings. For example, the computing system can access images in an existing listing. The computing system can analyze and rank images included in a posted listing (as described above) and recommend a new order for the images to a host to increase the booking possibilities for the listing. In one example, the computing system can periodically do this for existing listings and provide a notification or send a message to a host with a recommendation to automatically reorder the images for the listing in the ranking order determined by the computing system (as described above). In another example, a photo auto-rank on/off feature is provided in the listing user interface 402. If the user turns this feature on, the computing system will continually (e.g., periodically) and automatically reorder the photos (e.g., as the photo-ranking algorithm evolves). For instance, the computing system would detect that the auto-rank feature is selected by the user and, on a periodic basis, retrieve the images for the listing and rerank the images, as described above. The computing system would then automatically reorder the images in the listing according to the new ranking. These images would then be displayed in the list in the new ranked order.

In addition to using visual scores to rank images for a listing, visual scores of images in a listing can be used to determine an attractiveness of the listing overall. An overall visual score for a listing can indicate a listing quality. Such visual scores can predict a higher listing realized lifetime value (LTV) at the time of listing creation. For example, on average listings scoring higher (e.g., 80+ in a scale from 0 to 100) have a 4× higher realized LTV compared to listings scoring on the low end (e.g., 0-10). Moreover, visual scores predict new active listing booking success, with higher scoring listings generating 80% more in their first year compared to those scoring lower. These visual scores can also predict new active listing to FTBL conversion, predict better review ratings, and predict better listing quality across multiple categories (e.g., amenities, cleanliness, respond time), among other predictions.

Figure 9:
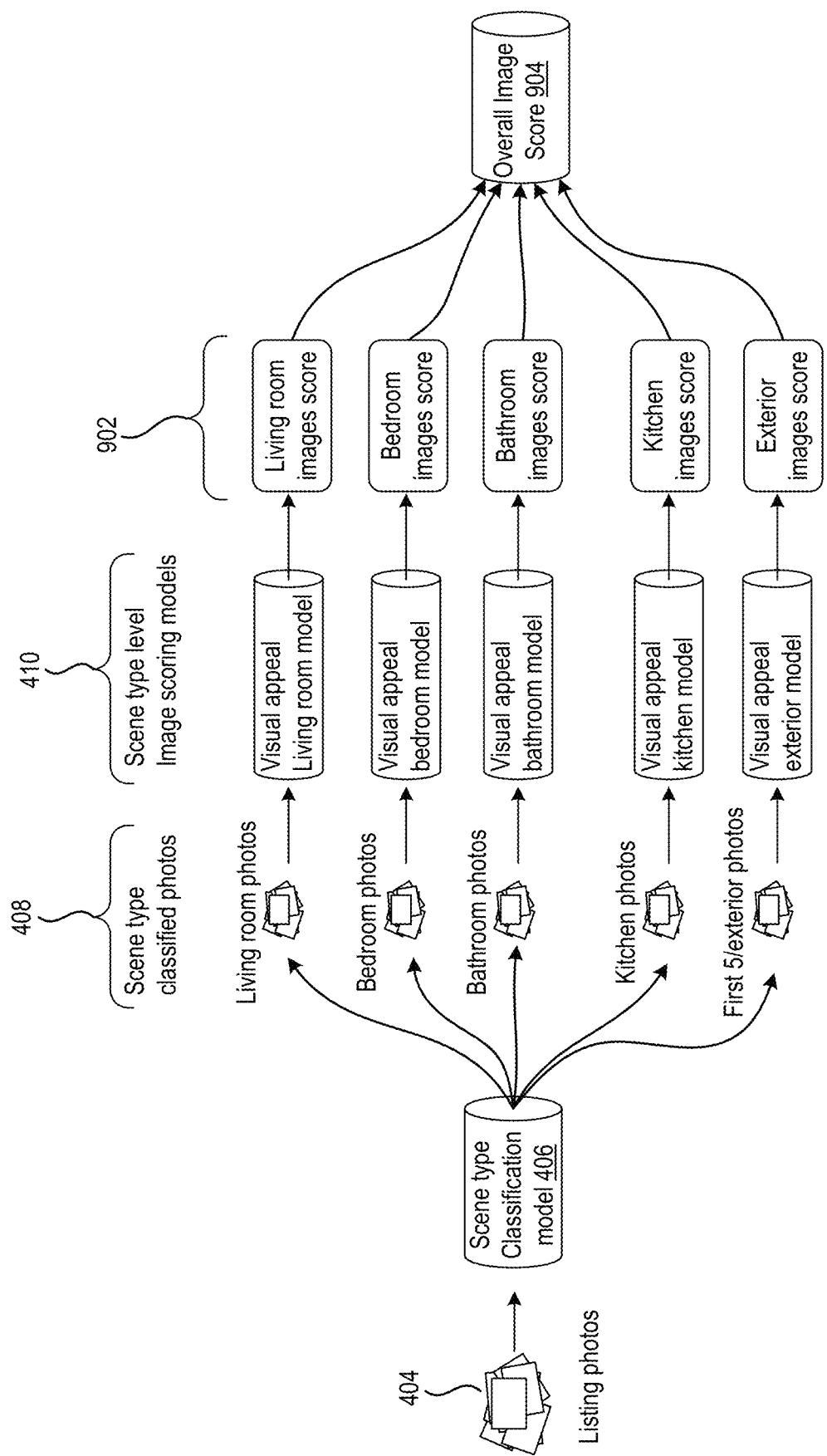
FIG. 9 illustrates a visual attractiveness scoring model for a listing in an online marketplace, according to some example embodiments.

FIG. 9 illustrates a visual attractiveness scoring model 900 for a listing in an online marketplace, according to some example embodiments. As described above with respect to the image ranking machine learning architecture 400 of FIG. 4, and labeled with the same reference numbers, the visual attractiveness scoring model 900 comprises the scene type classification model 406 that is used to classify images, such as listing photos 404, into one or more scene types, as shown by reference number 408. As also explained above, the classified images 408 are then input into a corresponding scene type level image scoring model 410 to output scene type image scores 902 for each scene type. The scene type image scores are then used to generate an overall image score 904 for the listing.

Figure 10:
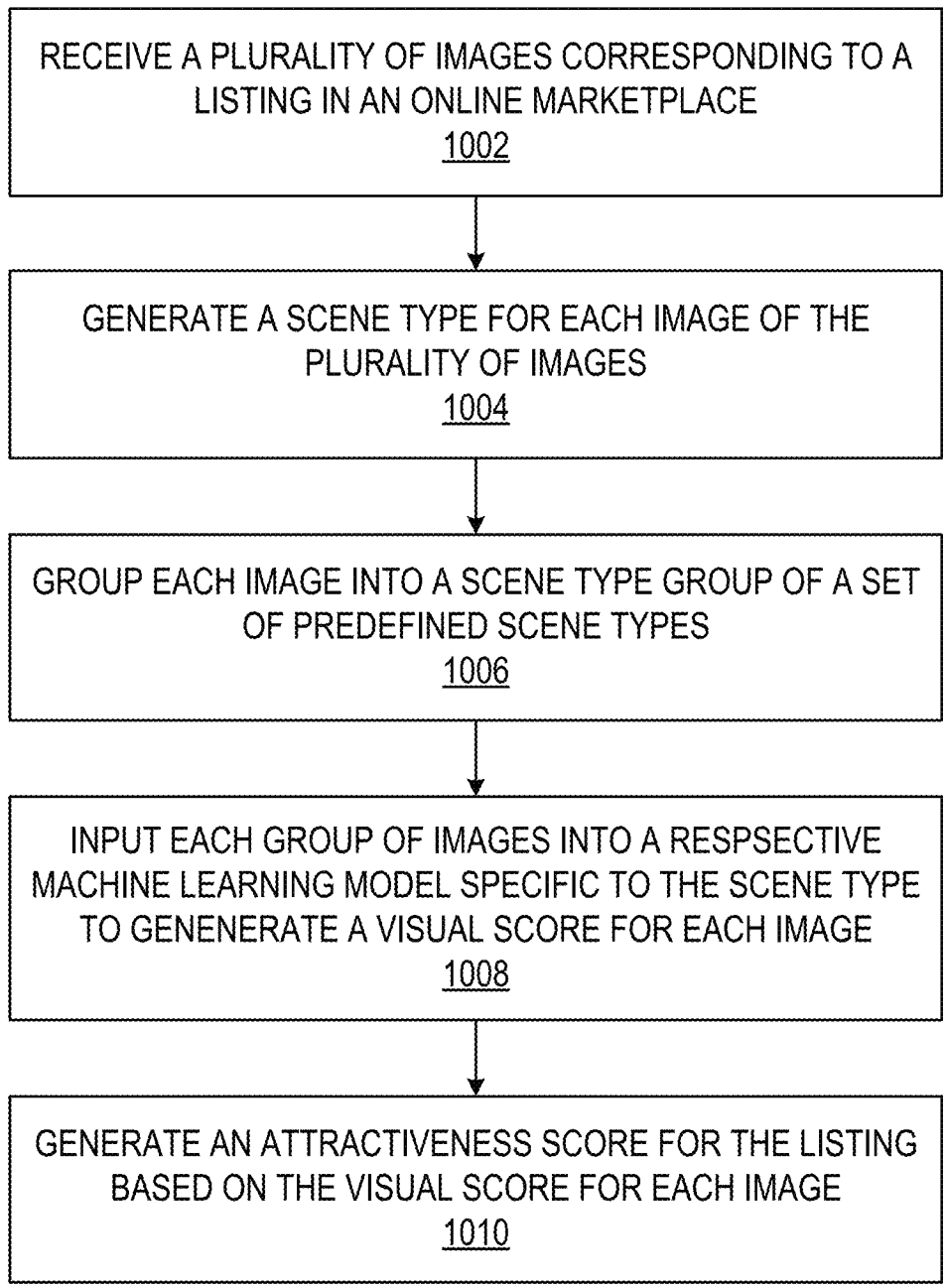
FIG. 10 is a flow chart illustrating aspects of a method for generating a visual or attractiveness score for a listing, according to some example embodiments.

FIG. 10 is a flow chart illustrating aspects of a method 1000 for generating a visual score for a listing utilizing the visual attractiveness scoring model 900, according to some example embodiments. For illustrative purposes, the method 1000 is described with respect to the networked system 100 of FIG. 1, the reservation system 124 of FIG. 2, and the visual attractiveness scoring model 900 of FIG. 9. It is to be understood that the method 1000 may be practiced with other system configurations in other embodiments.

In operation 1002, a computing system (e.g., the server system 102 and/or reservation system 124) receives a plurality of images corresponding to a listing in an online marketplace. In one example, the plurality of images are received as explained above with respect to operation 502 of FIG. 5 (e.g., uploaded via a computing device of a host for the listing and sent by the computing device to the computing system). In another example, the computing system accesses images of an existing listing in an online marketplace, such as accessing the images via one or more databases 126 comprising the images for the listing, to retrieve the images corresponding to the listing.

In operation 1004, the computing system generates a scene type for each image of the plurality of images, as also explained above with respect to operation 504 of FIG. 5 (e.g., a neural network classification machine learning model). In one example, the scene type can comprise one of a group comprising a living room, bedroom, bathroom, kitchen, or an exterior. In operation 1006, the computing system groups each image into a scene type group of a set of predetermined scene types based on the classification for each image. For example, images classified as a living room scene type would be grouped into a living room scene type group, images classified as a bedroom scene type would be grouped into a bedroom scene type group, and so forth.

In operation 1008, the computing system inputs each group of images into a respective machine learning model specific to the scene type of the group of images to generate a visual score for each image in each group of images. This is also described above with respect to operation 506 of FIG. 5 and with respect to FIG. 13. As also mentioned above, having a separate visual scoring machine learning model that specializes in evaluating a specific category or type of image can reduce the noise that each model has to deal with and provides for a more accurate scoring when the model just specializes in identifying attractive bedrooms, for example. This reduces the amount of photo variance each model has to deal with. Each separate visual scoring machine learning model is trained on images specific to the scene type in which it specializes.

As explained above, in one example, a machine learning model specific to a scene type is trained using historical listings in the online marketplace. In another example, two different machine learning models are used. A first machine learning model, referred to as a visual luxury model, is trained on historical listings that have a high percentage of professional quality images exhibiting luxury attributes such as spaciousness, desirable design elements and luxury amenities. A second machine learning model, referred to as a visual quality model, is trained on historical listings with a low percentage of professional quality images that also exhibit desirable attributes such as design elements and amenities. Either the first or second machine learning model can be used for each scene type machine learning model, or both can be used and the scores from each synthesized (e.g., averaged or combined for each image) to generate the scene type group score 902. For example, the visual quality model can be used for living room scene type images and the visual luxury model can be used for each of the other scene type images. This is just one example; any combination of use of the two models can be used in embodiments described herein.

In one example, an average of the visual scores in each group of images is used as the score for the images of each scene type. For example, if the group of living room photos is composed of three photos with visual scores of 0.92, 0.65, and 0.53, respectively, the average of these scores is 0.70, which is used as the living room images score 902.

In one example, each image is converted into image embeddings comprising a numerical representation of the image to represent the image as compactly as possible while trying to preserve as much signal as possible. Models such as a MobileNet V1 embeddings model can be used to convert each image into image embeddings. The converted images can then be input into the respective machine learning model specific to the scene type of the group of images to generate the visual score for each image in the group of images. It is to be understood that each image can be converted to image embeddings at any stage in the method 500 and 1000 to input the converted images into any machine learning model described herein (e.g., instead of the images themselves).

In operation 1010, the computing system generates the overall image score 904 (or attractiveness score) for the listing in the online marketplace based on the visual scores for each image in each group of images. In one example, the computing system can take an average of all image scores for all of the images. In another example, the computing system generates the attractiveness score by calculating an average visual score of the average visual scores for the groups of images. For example, if the average visual score for living room images is 0.70, the average visual score for bedroom images is 0.51, the average visual score for bathroom images is 0.47, the average visual score for kitchen images is 0.66, and the average visual score for exterior images is 0.50, the average of these scores is 0.57, which is used as the attractiveness score of the listing.

The visual or attractiveness score of a listing can be used in a wide variety of use case scenarios. For example, the visual or attractiveness score for a listing can be used to provide more accurate calendar pricing suggestions to listing owners, generate better potential earnings estimates for a listing, create sets of comparable listings for hosts to get guidance and inspiration from, automatically score competitor platform listings, understand guest segments based on past listing engagement behavior, optimize supply and demand by identifying quality supply and demand imbalances, generate personalized search results for a guest to maximize conversion and minimize friction, and so forth.

Figure 11:
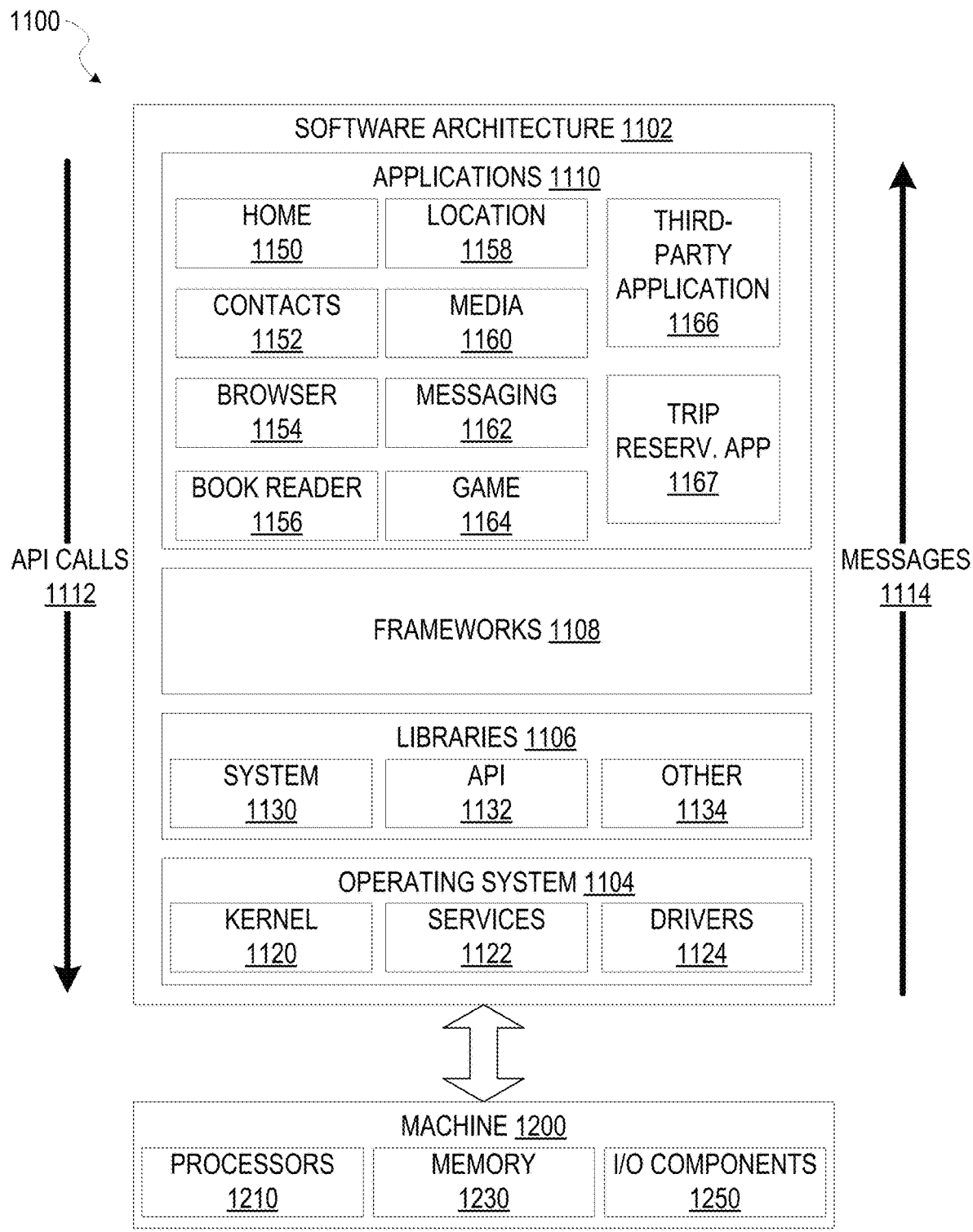
FIG. 11 is a block diagram illustrating an example of a software architecture that may be installed on a machine, according to some example embodiments.

FIG. 11 is a block diagram 1100 illustrating a software architecture 1102, which can be installed on any one or more of the devices described above. For example, in various embodiments, the client device 110 and server systems 130, 102, 120, 122, and 124 may be implemented using some or all of the elements of the software architecture 1102. FIG. 11 is merely a nonlimiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and input/output (I/O) components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionalities. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render graphic content in two dimensions (2D) and in three dimensions (3D) on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications, such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Some embodiments may particularly include a trip reservation application 1167, which may be any application that requests data or other tasks to be performed by systems and servers described herein, such as the server system 102, third-party servers 130, and so forth. In certain embodiments, this may be a standalone application that operates to manage communications with a server system such as the third-party servers 130 or server system 102. In other embodiments, this functionality may be integrated with another application. The trip reservation application 1167 may request and display various data related to an online marketplace and may provide the capability for a user 106 to input data related to the system via voice, a touch interface, or a keyboard, or using a camera device of the machine 1200, communication with a server system via the I/O components 1250, and receipt and storage of object data in the memory 1230. Presentation of information and user inputs associated with the information may be managed by the trip reservation application 1167 using different frameworks 1108, library 1106 elements, or operating system 1104 elements operating on a machine 1200.

Figure 12:
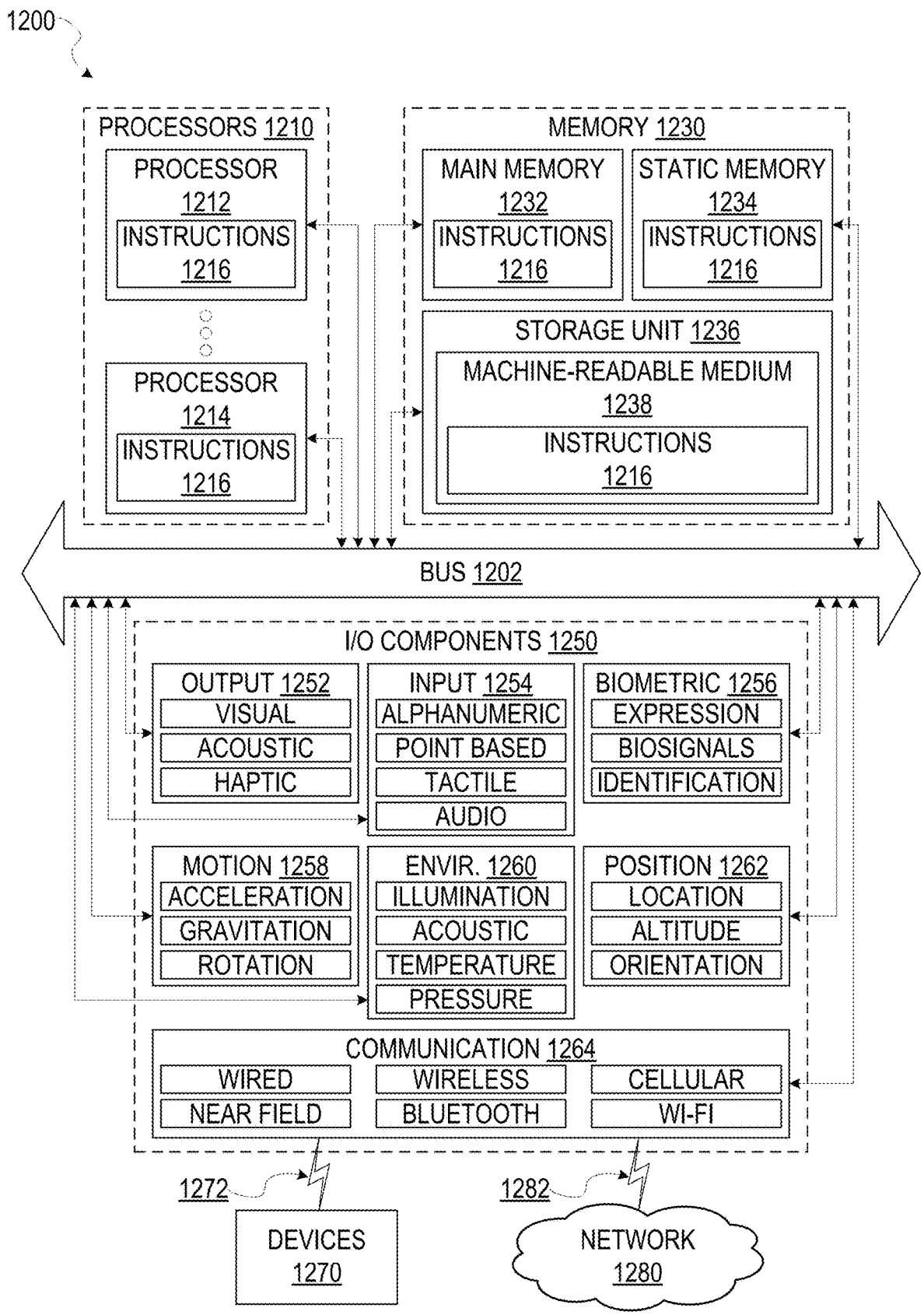
FIG. 12 illustrates a diagrammatic representation of a machine, in the form of a computer system, within which a set of instructions may be executed for causing the machine to perform any one or more of the methodologies discussed herein, according to an example embodiment.

FIG. 1200 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application 1110, an applet, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server system 130, 102, 120, 122, 124, and the like, or a client device 110 in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1212, 1214 with multiple cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other nonvolatile memory (e.g., erasable programmable read-only memory (EPROM)), or any suitable combination thereof. The term "machine-readable medium" specifically excludes nonstatutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, eye tracking), measure biosignals (e.g., blood pressure, heart rate, body temperature, perspiration, brain waves), identify a person (e.g., voice identification, retinal identification, facial identification, fingerprint identification, electroencephalogram-based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine 1200 or any of a wide variety of peripheral devices (e.g., a peripheral device coupled via a USB).

Moreover, in some embodiments, the communication components 1264 detect identifiers or include components operable to detect identifiers. For example, the communication components 1264 include radio frequency identification (RFID) tag reader components, NFC smart tag detection components, optical reader components (e.g., an optical sensor to detect one-dimensional bar codes such as a Universal Product Code (UPC) bar code, multidimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1280 can be an ad hoc network, an intranet, an extranet, a VPN, a LAN, a WLAN, a WAN, a WWAN, a MAN, the internet, a portion of the internet, a portion of the PSTN, a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile (GSM) communications connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., HTTP). Similarly, in other example embodiments, the instructions 1216 are transmitted or received using a transmission medium via the coupling 1272 (e.g., peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "nontransitory" should not be construed to mean that the medium is incapable of movement; the machine-readable medium 1238 should be considered as being transportable from one physical location to another. Additionally, since the machine-readable medium 1238 is tangible, the machine-readable medium 1238 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method, comprising:
   generating, by a computing system using a visual scoring machine learning model trained on historical listings in an online marketplace, a base visual score for each image of a plurality of images corresponding to a listing in the online marketplace;
   for each image of the plurality of images:
     multiplying the base visual score by a feature importance weight to generate a first visual score;
     adding respective scene type bonus points to the first visual score to generate a second visual score; and
     adding diversity scoring points to the second visual score to generate a final visual score for the image;
   ranking the plurality images based on the final visual scores; and
   providing a specified number of top-ranked candidate images to be displayed on a display of a computing device in an order ranked by the final visual scores.

2. The computer-implemented method of claim 1, wherein before generating the base visual score for each image of the plurality of images, the method comprises:
   grouping, by the computing system, the plurality of images by scene type; and
   generating the base visual score for each image of the plurality of images based on the scene type.

3. The computer-implemented method of claim 2, wherein generating the base visual score for each image of the plurality of images based on scene type comprises inputting each image into a machine learning model corresponding to the scene type for the image.

4. The computer-implemented method of claim 1, wherein before generating the final visual score for each image of the plurality of images, the method comprises:
   discarding images in the plurality of images that do not have a base visual score over a predetermined visual score threshold.

5. The computer-implemented method of claim 1, wherein the feature importance weight is derived from coefficients in a logistic regression model trained to determine a probability of a listing getting booked based on a cover photo, scene types of a first predetermined number of photos in the listing, and an average visual score for the first predetermined number of photos in the listing.

6. The computer-implemented method of claim 1, wherein diversity for each image comprises:
   adding a diversity bonus to the base score of each image having a highest visual score in a scene type of a first subset of specific scene types; and
   adding a diversity penalty to the base score of each image having a scene type of a second subset of specified scene types.

7. The computer-implemented method of claim 6, wherein the second subset of specified scene types are scene types that have negative coefficients derived from using a logistic regression model trained to determine a probability of a listing getting booked based on a cover photo, scene types of a first predetermined number of photos in the listing, and an average visual score for the first predetermined number of photos in the listing.

8. The computer-implemented method of claim 1, wherein before generating the final visual score for each image of the plurality of images, the method comprises:
   discarding images in the plurality of images that are not of a scene type included in a predetermined group of scene types.

9. A computing system comprising:
   a memory that stores instructions; and
   one or more processors configured by the instructions to perform operations comprising:
   generating, using a visual scoring machine learning model trained on historical listings in an online marketplace, a base visual score for each image of a plurality of images corresponding to a listing in the online marketplace;
   for each image of the plurality of images:
     multiplying the base visual score by a feature importance weight to generate a first visual score;
     adding respective scene type bonus points to the first visual score to generate a second visual score; and
     adding diversity scoring points to the second visual score to generate a final visual score for the image;
   ranking the plurality images based on the final visual scores; and
   providing a specified number of top-ranked candidate images to be displayed on a display of a computing device in an order ranked by the final visual scores.

10. The computing system of claim 9, wherein before generating the base visual score for each image of the plurality of images, the operations comprise:
    grouping the plurality of images by scene type; and
    generating the base visual score for each image of the plurality of images based on the scene type.

11. The computing system of claim 10, wherein generating the base visual score for each image of the plurality of images based on scene type comprises inputting each image into a machine learning model corresponding to the scene type for the image.

12. The computing system of claim 9, wherein before generating the final visual score for each image of the plurality of images, the operations comprise:
    discarding images in the plurality of images that do not have a base visual score over a predetermined visual score threshold.

13. The computing system of claim 9, wherein the feature importance weight is derived from coefficients in a logistic regression model trained to determine a probability of a listing getting booked based on a cover photo, scene types of a first predetermined number of photos in the listing, and an average visual score for the first predetermined number of photos in the listing.

14. The computing system of claim 9, wherein diversity for each image comprises:
  adding a diversity bonus to the base score of each image having a highest visual score in a scene type of a first subset of specific scene types; and
  adding a diversity penalty to the base score of each image having a scene type of a second subset of specified scene types.

15. The computing system of claim 14, wherein the second subset of specified scene types are scene types that have negative coefficients derived from using a logistic regression model trained to determine a probability of a listing getting booked based on a cover photo, scene types of a first predetermined number of photos in the listing, and an average visual score for the first predetermined number of photos in the listing.

16. The computing system of claim 9, wherein before generating the final visual score for each image of the plurality of images, the operations comprise:
  discarding images in the plurality of images that are not of a scene type included in a predetermined group of scene types.

17. A nontransitory computer-readable medium comprising instructions stored thereon that are executable by at least one processor to cause a computing system to perform operations comprising:
  generating, using a visual scoring machine learning model trained on historical listings in an online marketplace, a base visual score for each image of a plurality of images corresponding to a listing in the online marketplace;
  for each image of the plurality of images:
    multiplying the base visual score by a feature importance weight to generate a first visual score;
    adding respective scene type bonus points to the first visual score to generate a second visual score; and
    adding diversity scoring points to the second visual score to generate a final visual score for the image;
  ranking the plurality images based on the final visual scores; and
  providing a specified number of top-ranked candidate images to be displayed on a display of a computing device in an order ranked by the final visual scores.

18. The nontransitory computer-readable medium of claim 17, wherein before generating the base visual score for each image of the plurality of images, the operations comprise:
  grouping the plurality of images by scene type;
  generating the base visual score for each image of the plurality of images based on the scene type; and
  wherein generating the base visual score for each image of the plurality of images based on scene type comprises inputting each image into a machine learning model corresponding to the scene type for the image.

19. The nontransitory computer-readable medium of claim 17, wherein the feature importance weight is derived from coefficients in a logistic regression model trained to determine a probability of a listing getting booked based on a cover photo, scene types of a first predetermined number of photos in the listing, and an average visual score for the first predetermined number of photos in the listing.

20. The nontransitory computer-readable medium of claim 17, wherein diversity for each image comprises:
  adding a diversity bonus to the base score of each image having a highest visual score in a scene type of a first subset of specific scene types; and
  adding a diversity penalty to the base score of each image having a scene type of a second subset of specified scene types.

* * * * *